(12) United States Patent
Matsumoto et al.

(10) Patent No.: US 8,630,770 B2
(45) Date of Patent: Jan. 14, 2014

(54) VEHICLE AND FEEDBACK CONTROL METHOD

(75) Inventors: Keiji Matsumoto, Osaka (JP); Jun Terashima, Osaka (JP)

(73) Assignee: Yanmar, Co., Ltd., Osaka (JP)

( * ) Notice: Subject to any disclaimer, the term of this patent is extended or adjusted under 35 U.S.C. 154(b) by 56 days.

(21) Appl. No.: 13/264,805

(22) PCT Filed: Mar. 11, 2010

(86) PCT No.: PCT/JP2010/054093
§ 371 (c)(1),
(2), (4) Date: Oct. 17, 2011

(87) PCT Pub. No.: WO2010/119740
PCT Pub. Date: Oct. 21, 2010

(65) Prior Publication Data
US 2012/0046835 A1    Feb. 23, 2012

(30) Foreign Application Priority Data

Apr. 17, 2009 (JP) ................................ 2009-101441
May 7, 2009 (JP) ................................ 2009-112944
Sep. 8, 2009 (JP) ................................ 2009-207165

(51) Int. Cl.
*G06F 7/00* (2006.01)

(52) U.S. Cl.
USPC .......................................................... 701/41

(58) Field of Classification Search
USPC ........................................ 701/1, 41
See application file for complete search history.

(56) References Cited

FOREIGN PATENT DOCUMENTS

| JP | 02-220972 | 9/1990 |
|----|-----------|--------|
| JP | H3-26672 | 3/1991 |
| JP | 03-132801 | 6/1991 |
| JP | 04-287776 | 10/1992 |
| JP | 05-058330 | 3/1993 |
| JP | 05-080810 | 4/1993 |
| JP | 06-242836 | 9/1994 |
| JP | H09294779 A | 11/1997 |
| JP | 09-315334 | 12/1997 |
| JP | 10-244951 | 9/1998 |
| JP | 2000-267714 | 9/2000 |
| JP | 2008-013045 | 1/2008 |

OTHER PUBLICATIONS

International Search Report for International Application No. PCT/JP2010/054093, mailed Jun. 15, 2010, 6 pages.
International Preliminary Examination Report for International Application No. PCT/JP2010/054093, mailed Jul. 13, 2011, 9 pages.
Notice of Reasons for Refusal in corresponding Japanese Application No. JP 2009-101441 with its English translation mailed Jul. 9, 2013, 4 pages.
Notice of Reasons for Refusal in corresponding Japanese Application No, JP2009-112944 with its English translation mailed Jul. 9, 2013, 4 pages.

*Primary Examiner* — Yonel Beaulieu
(74) *Attorney, Agent, or Firm* — Sterne, Kessler, Goldstein & Fox P.L.L.C.

(57) ABSTRACT

A vehicle capable of easily translating in an arbitrary direction. A vehicle comprising: wheels composed of two front wheels and two rear wheels; four steering actuators connected to the wheels, respectively, and steering the wheels; four drive actuators connected to the wheels, respectively, and driving the wheels; a joystick (64) tiltable in an arbitrary direction to perform operation and instructing the operation of the steering actuators; an accelerator pedal (63) for instructing the operation of the drive actuators; and a controller (100) which, when the joystick (64) is tilted, steers the wheels in the direction in which the joystick (64) is tilted, and when the accelerator pedal (63) is operated, drives the wheels on the basis of the amount of the operation of the accelerator pedal (63).

4 Claims, 30 Drawing Sheets

Fig. 4
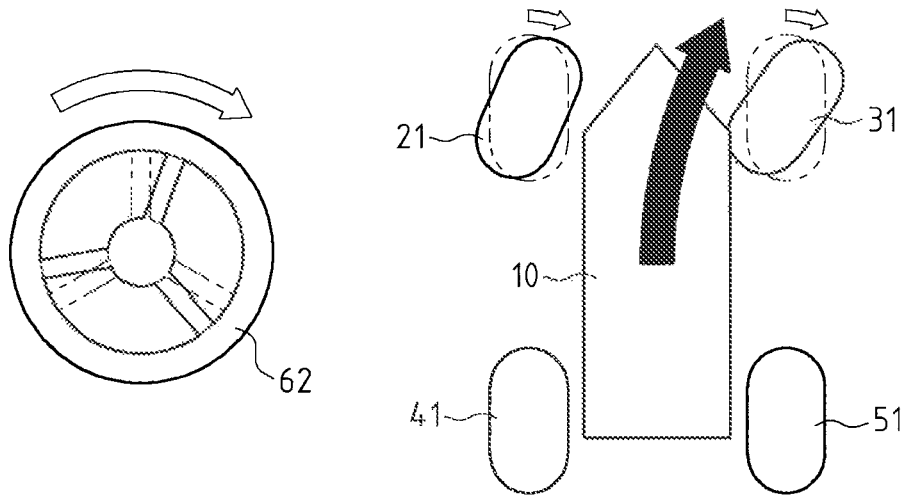
(a)
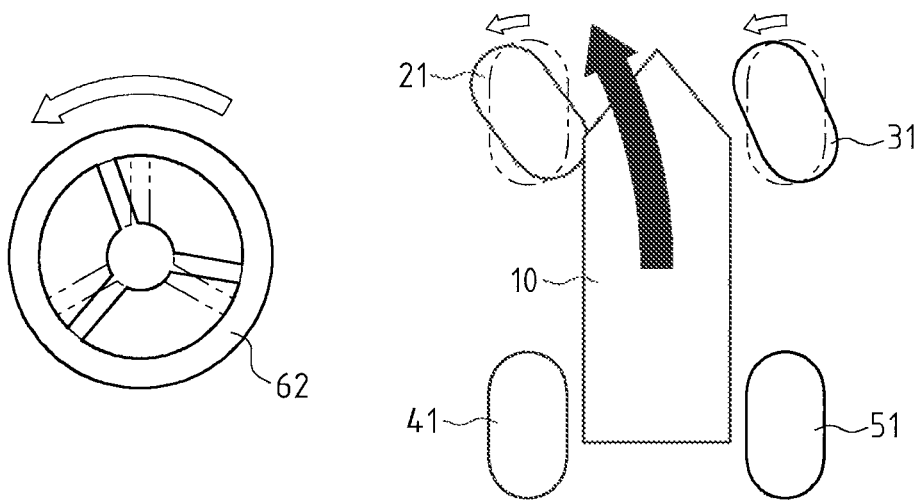
(b)

Fig. 11
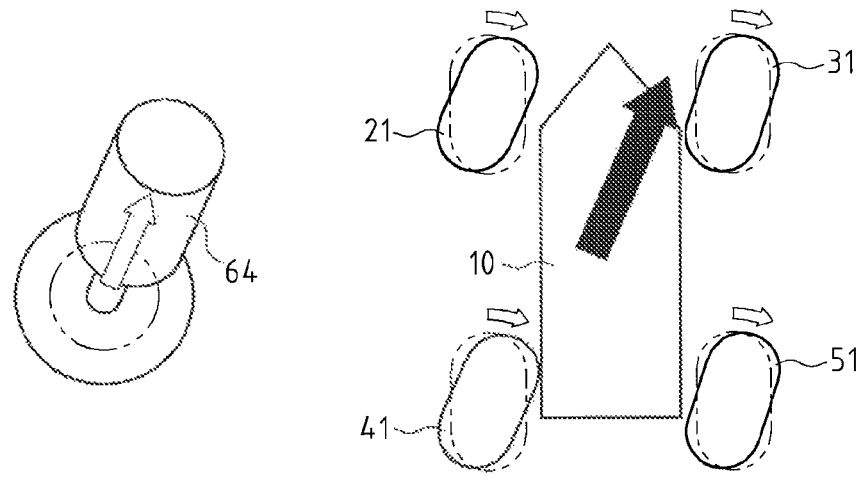
(a)
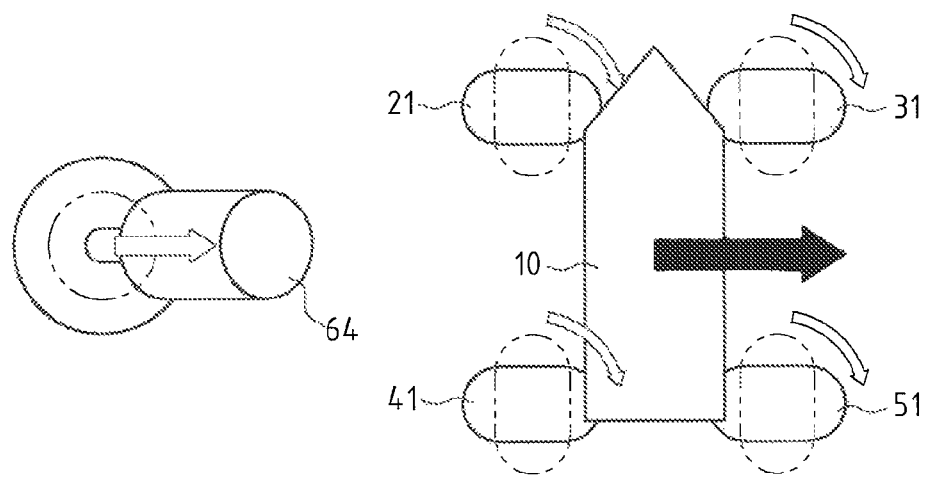
(b)

Fig. 12
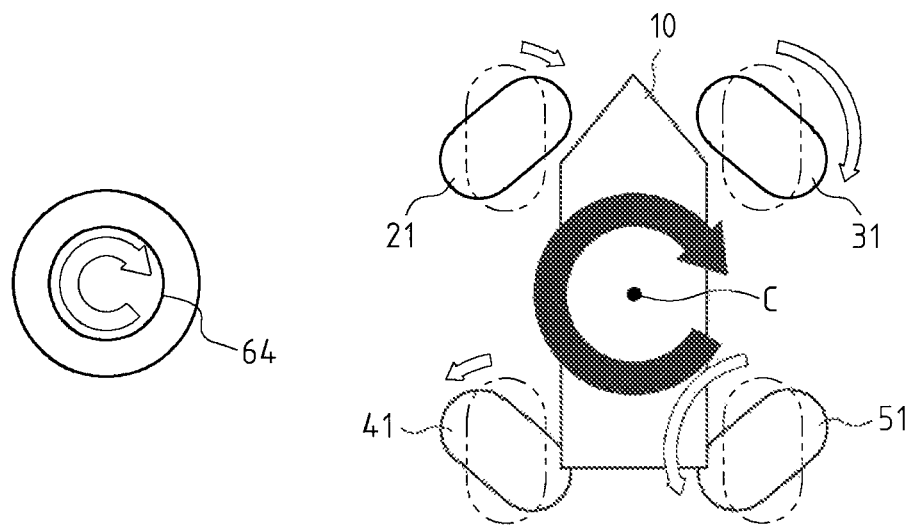
(a)
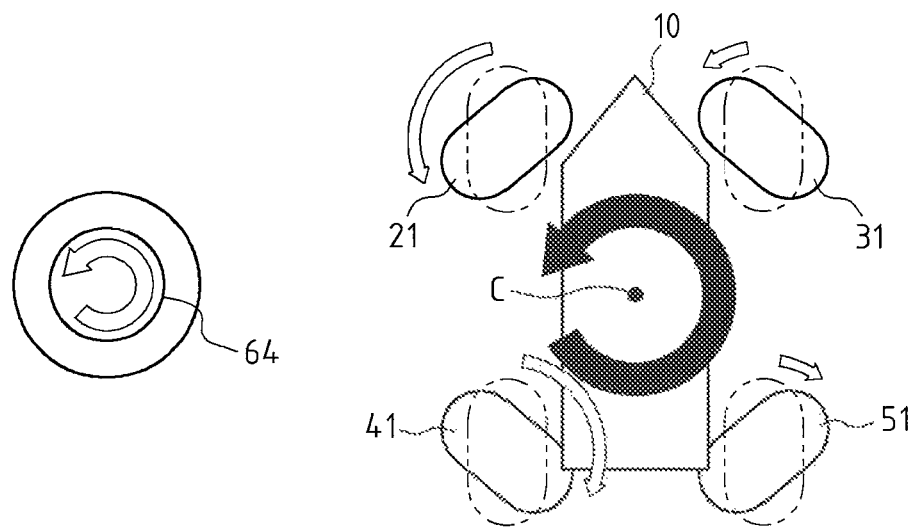
(b)

Fig. 13
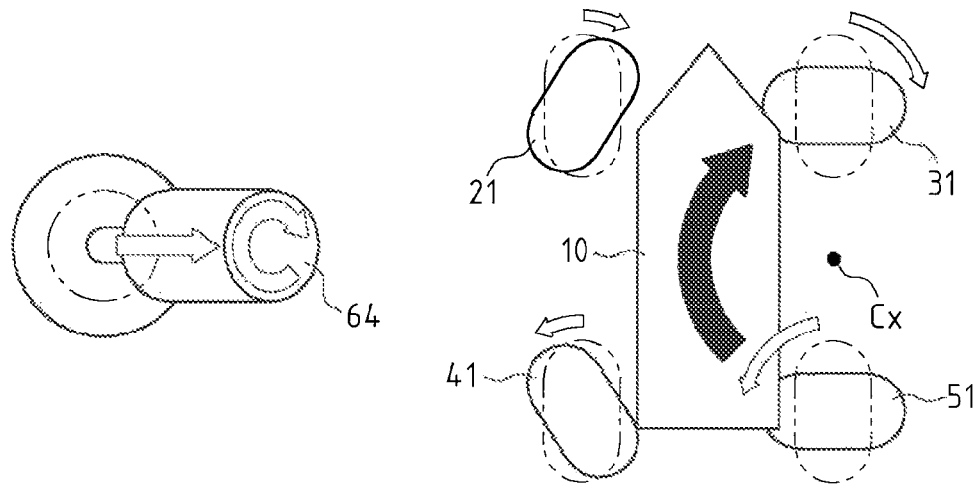
(a)
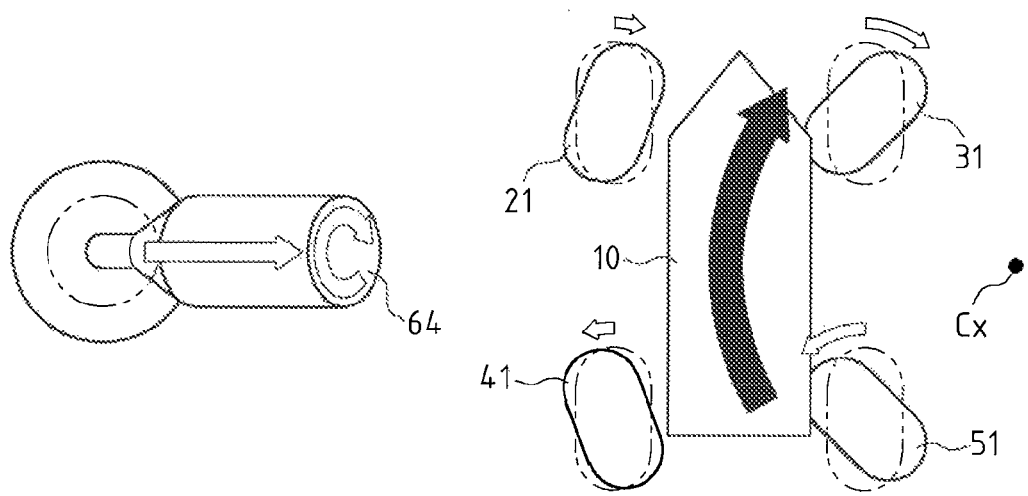
(b)

Fig. 14
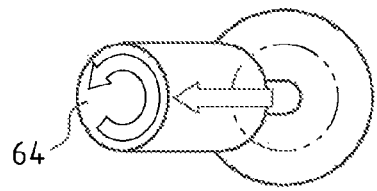
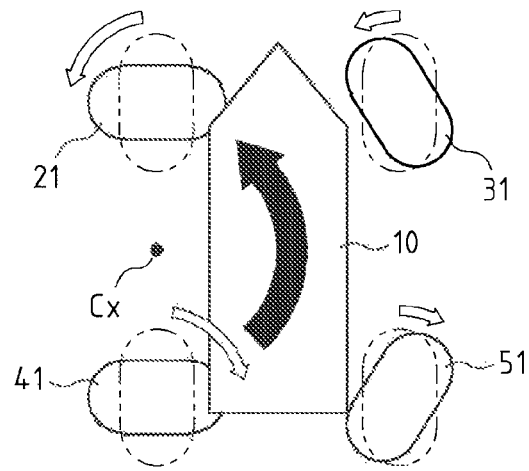
(a)
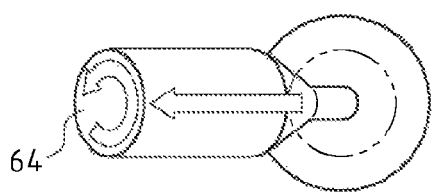
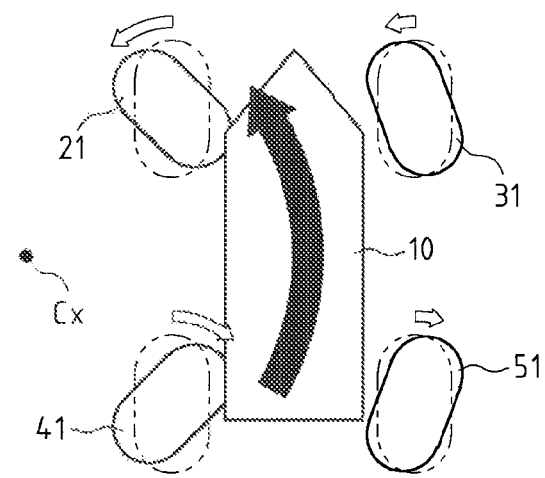
(b)

Fig. 17
(a)
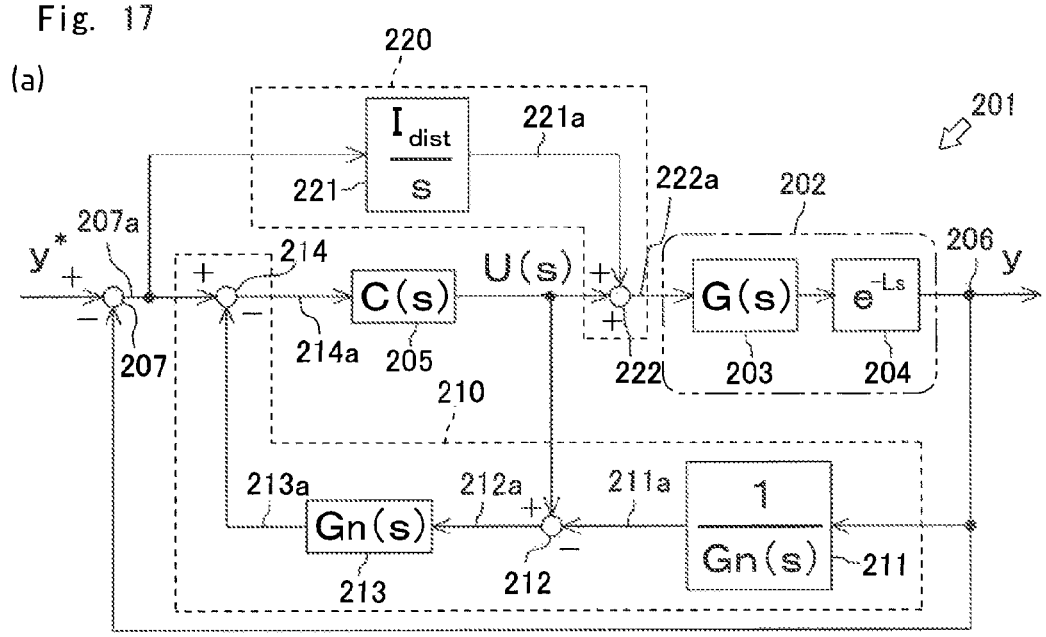
(b)
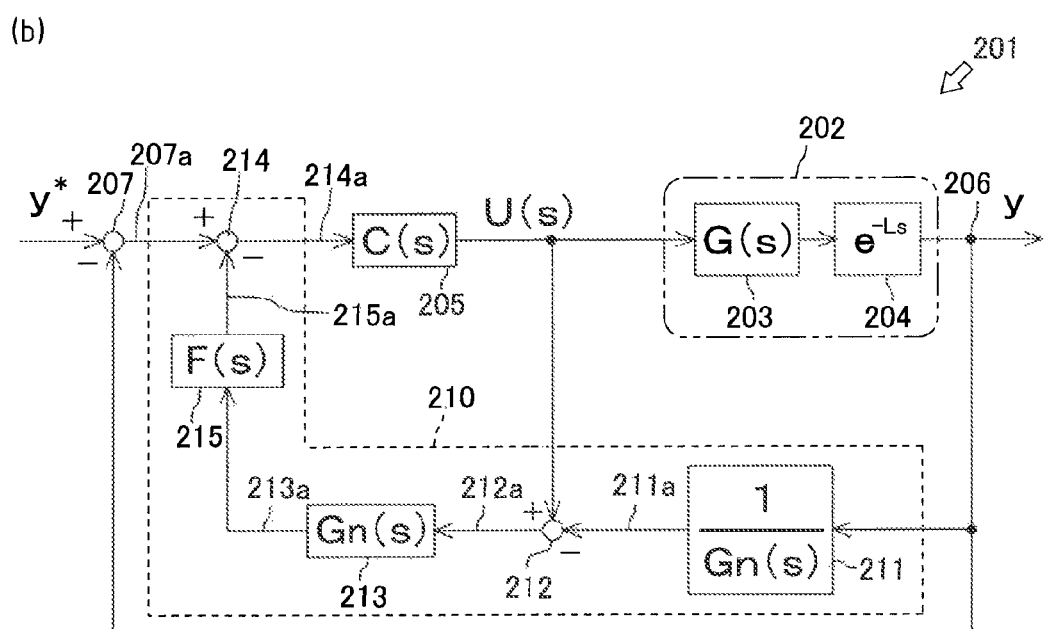

Fig. 19
(a)
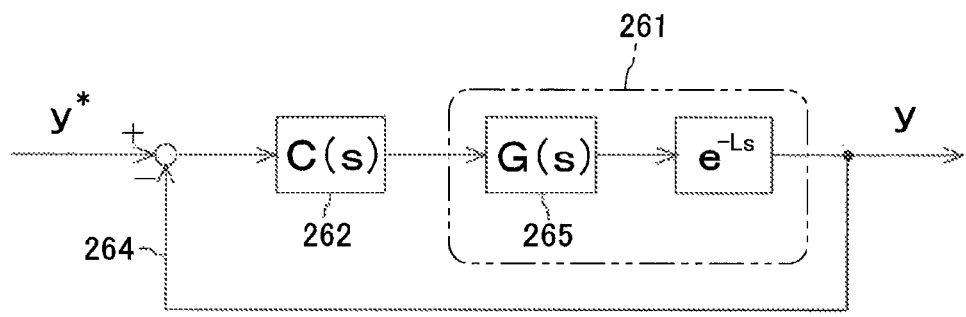
(b)
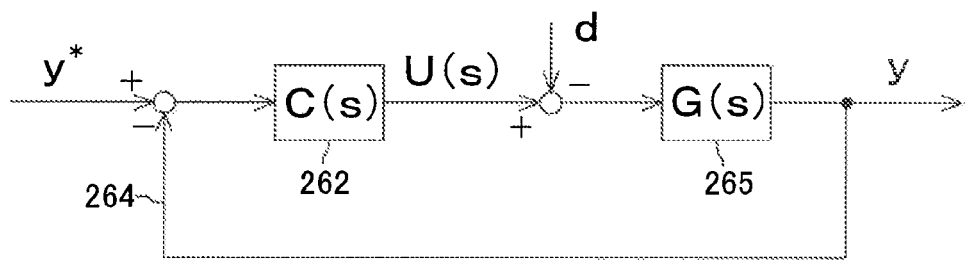

Fig. 20
(a)
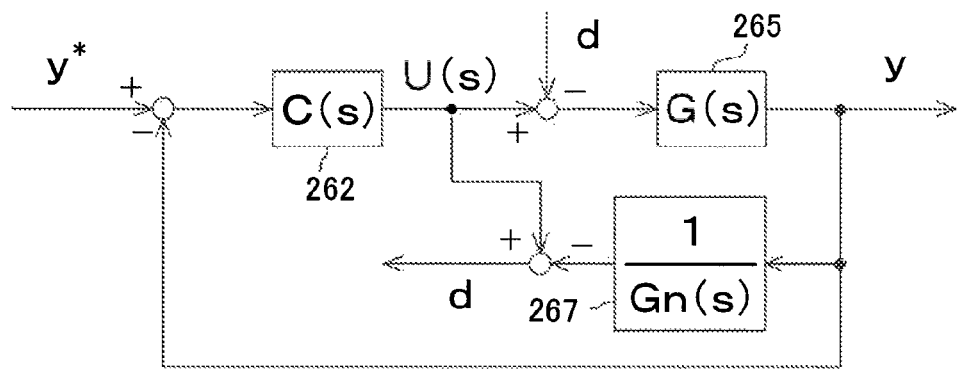
(b)
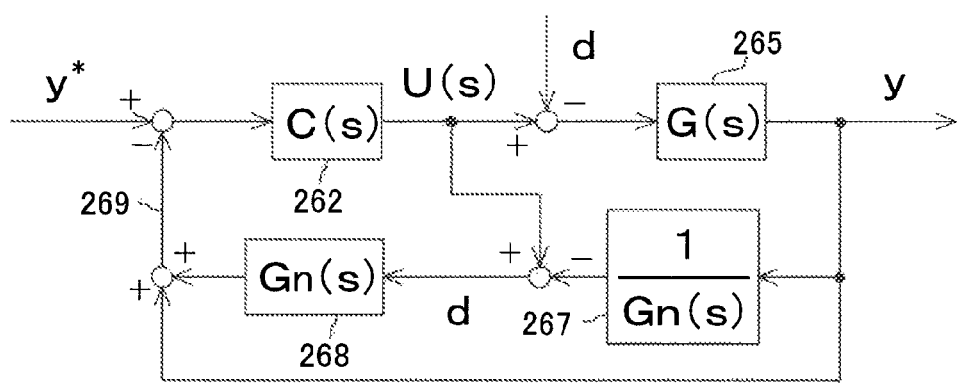

Fig. 21
(a)
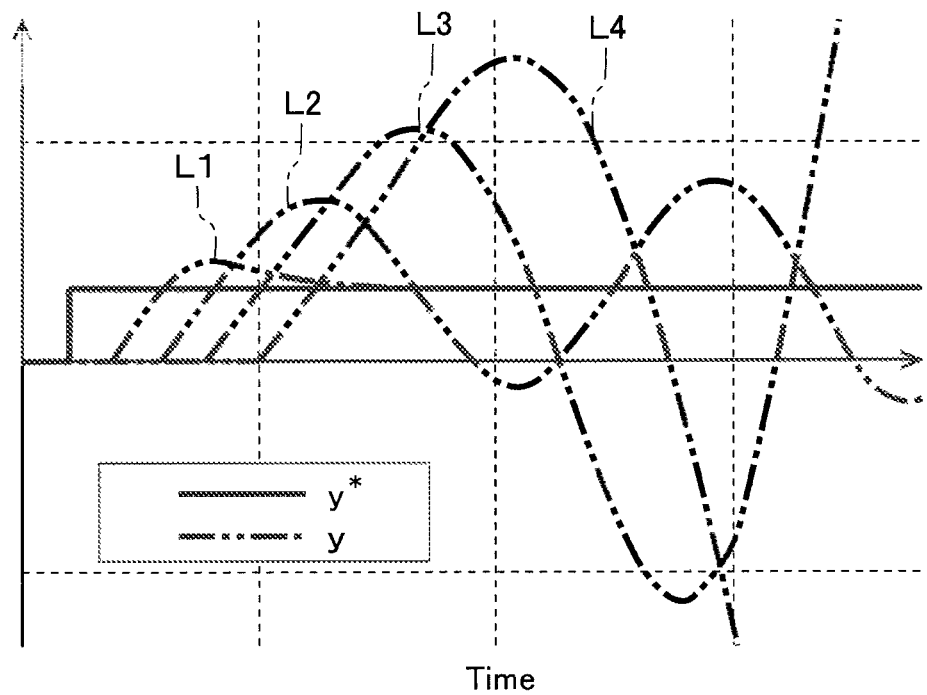
(b)
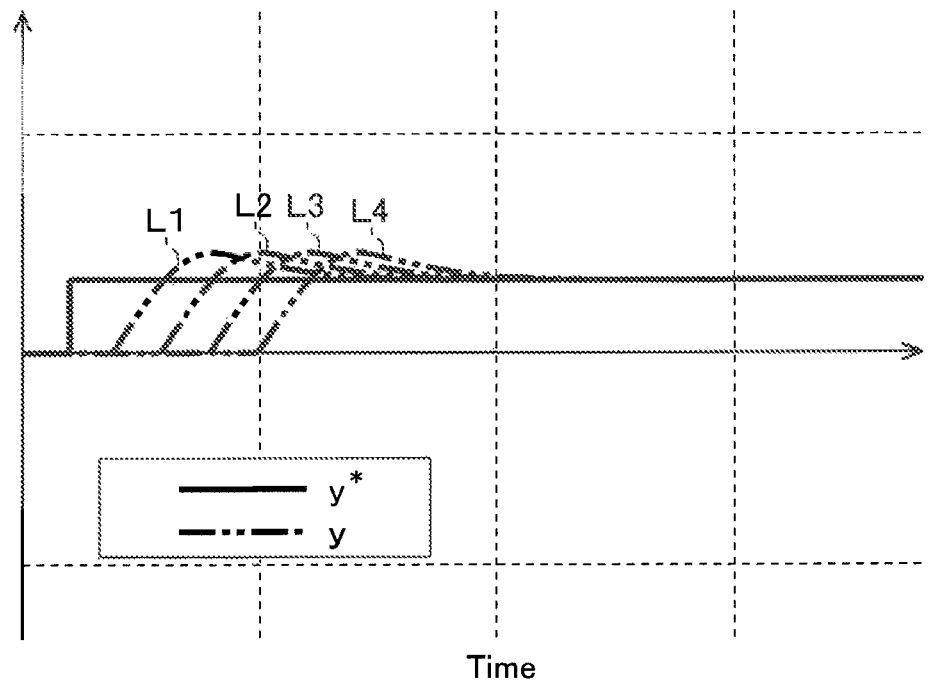

Fig. 22
(a)
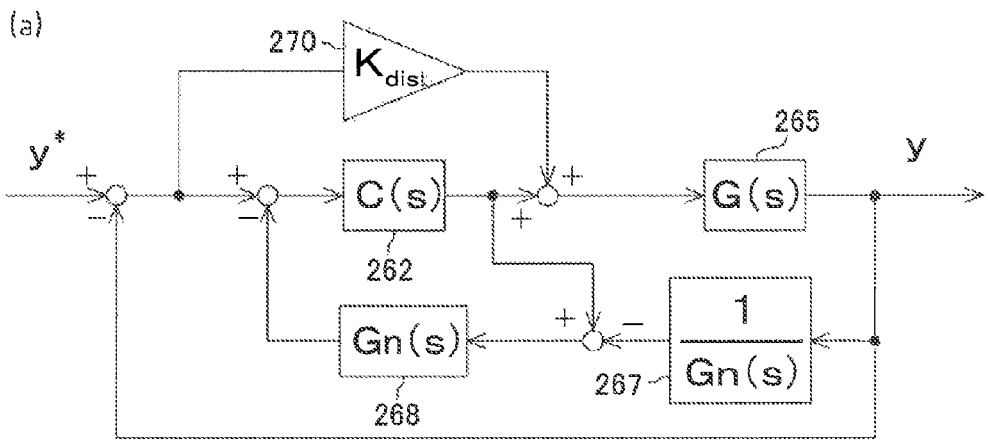
(b)
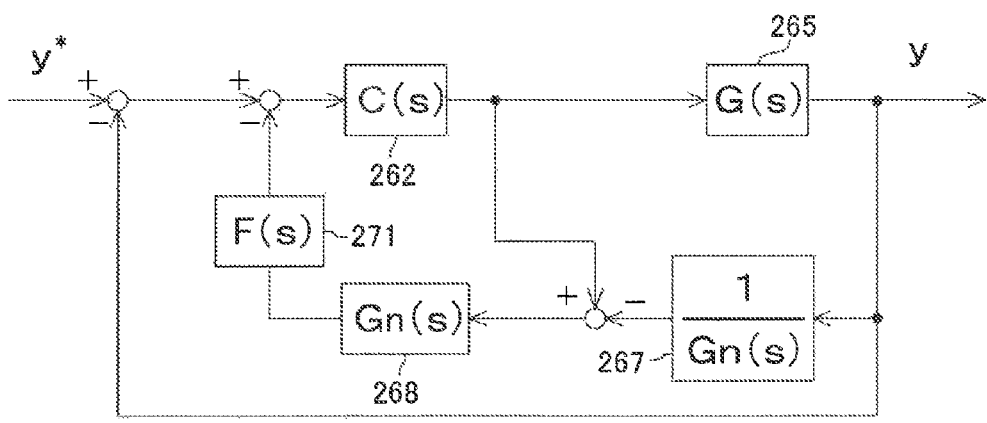

Fig. 28
(a)
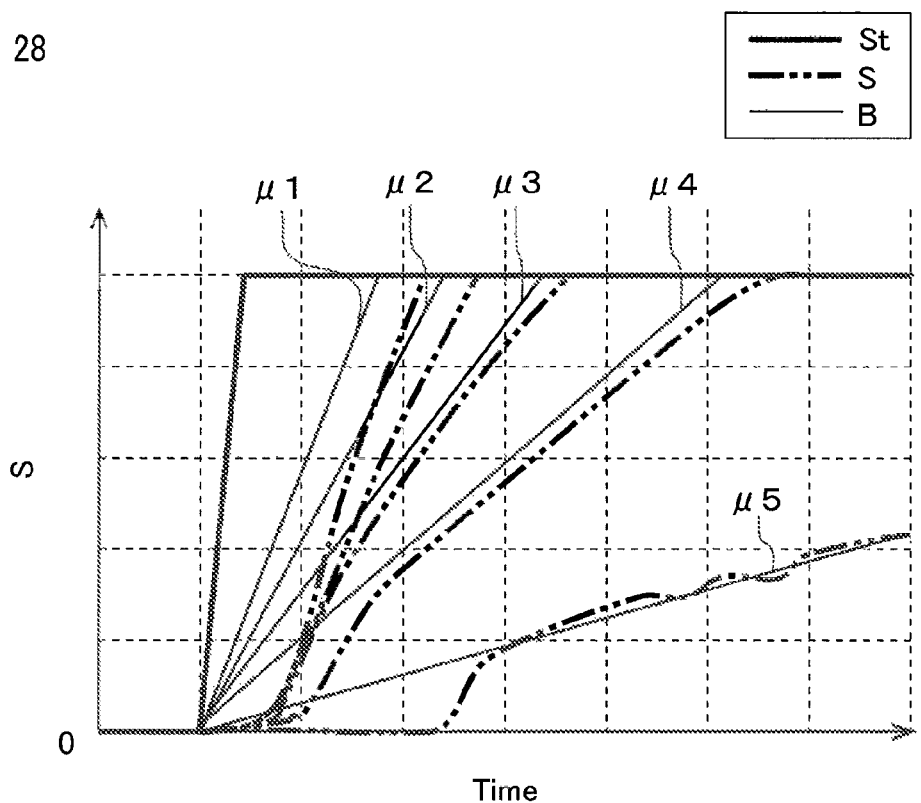
(b)
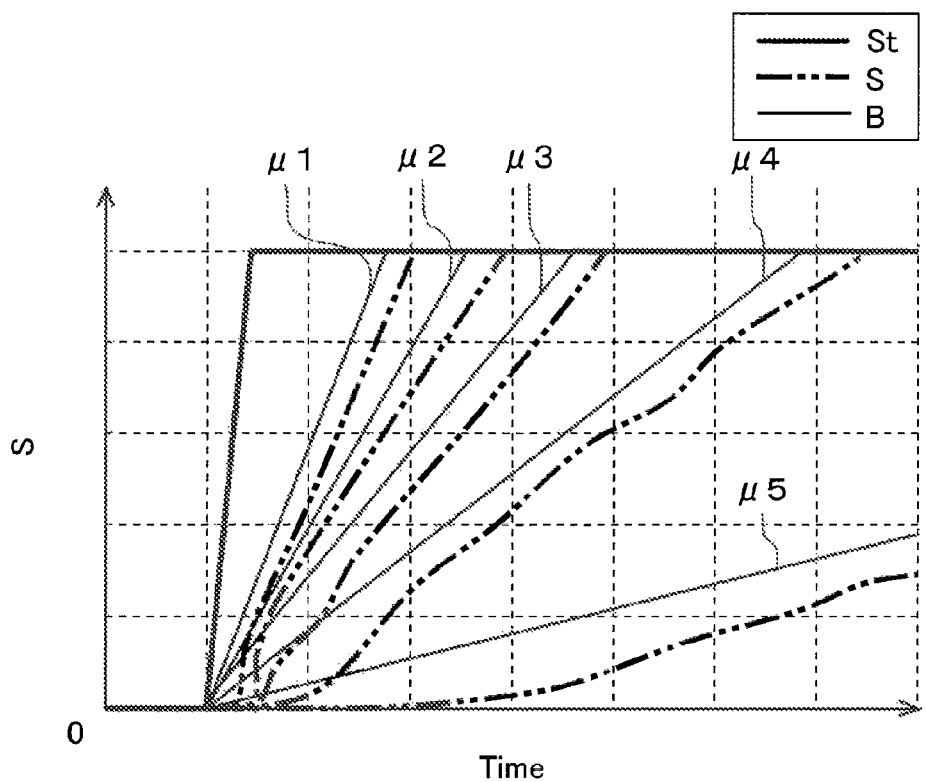

Fig. 29
(a)
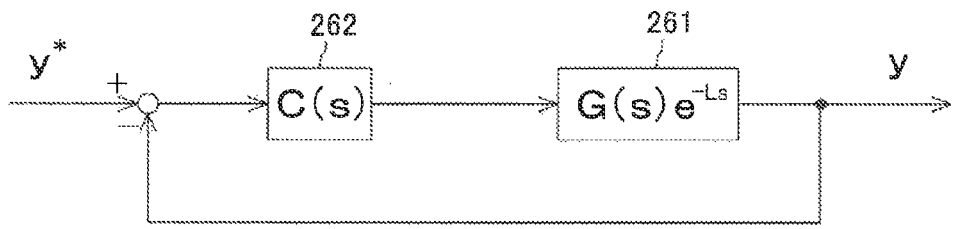
(b)
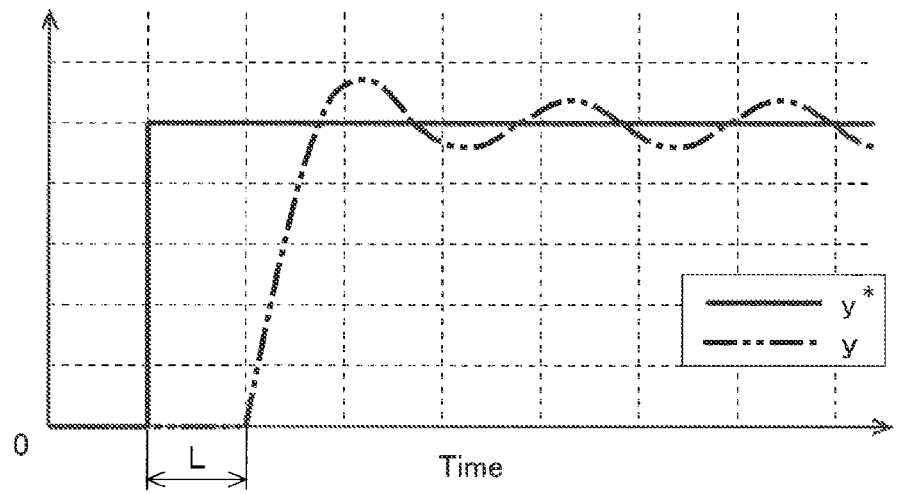
(c)
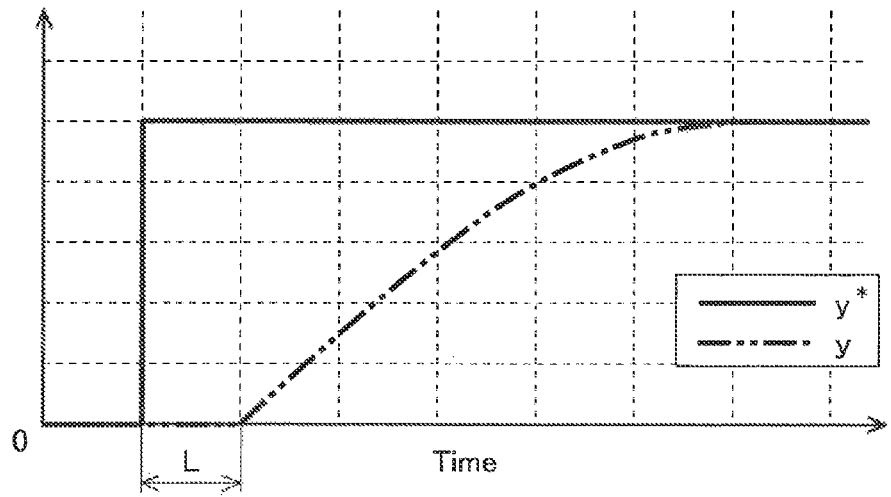

Fig. 30
(a)
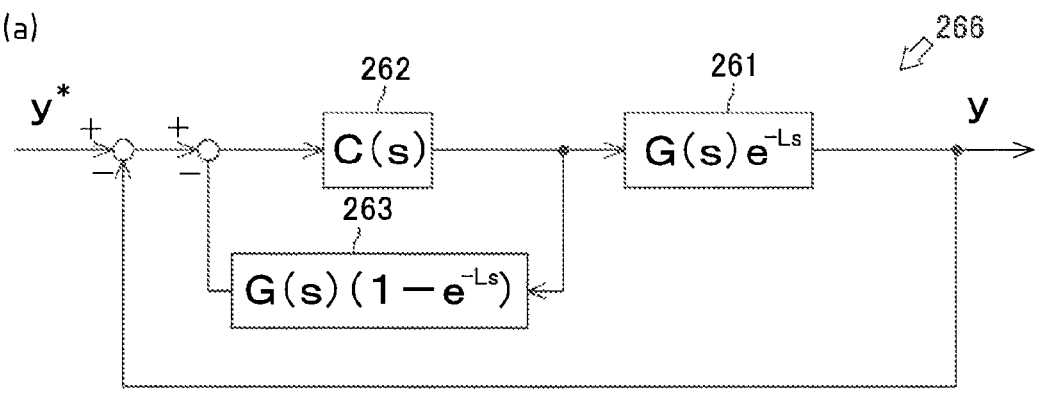
(b)
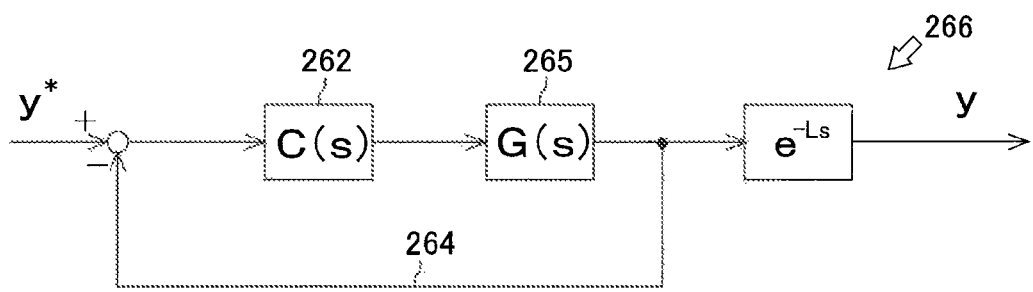
(c)
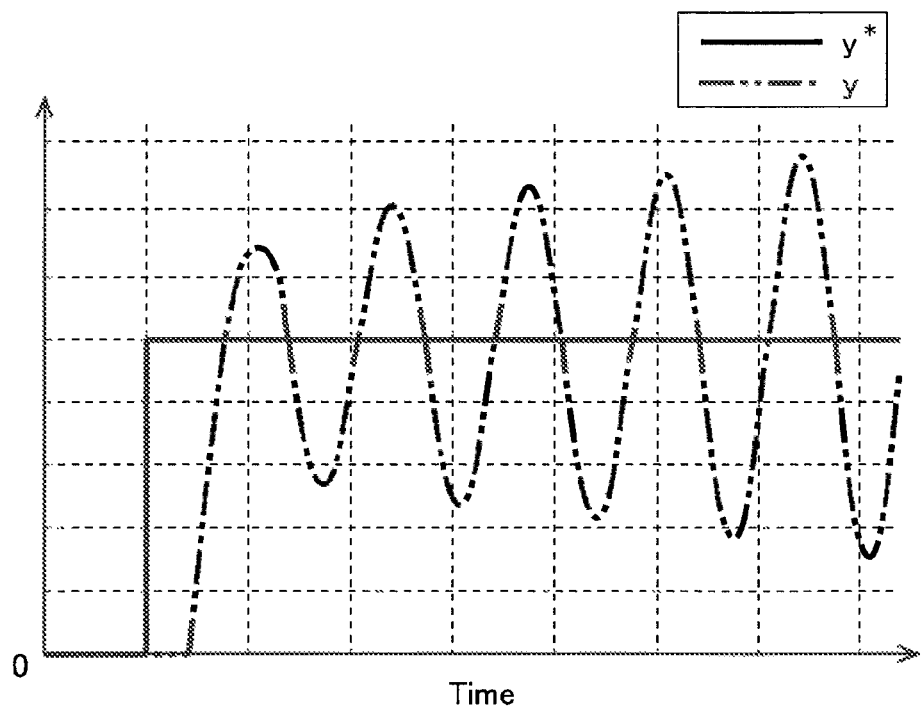

VEHICLE AND FEEDBACK CONTROL METHOD

TECHNICAL FIELD

The present invention relates to an art of a vehicle which can steer four wheels independently. In more detail, the present invention relates to an art of control for steering the four wheels based on an operation member.

BACKGROUND ART

Conventionally, an art of a vehicle is well known which can steer four wheels independently. As such an art of a vehicle, a vehicle described in the Patent Literature 1 is known.

The vehicle described in the Patent Literature 1 has a mode selection means selecting one of a normal mode, a parallel traveling mode and a rotation mode and a direction selection means selecting a traveling direction.

When the mode selection means selects the normal mode, only front wheels of the vehicle are steered by steering operation.

When the mode selection means selects the rotation mode, the front wheels are steered so as to make the front sides thereof close to each other and rear wheels are steered so as to separate the front sides thereof. In this state, by driving each wheel to a predetermined direction, the vehicle can turn centering on a predetermined turning center.

When the mode selection means selects the parallel traveling mode, the four wheels of the vehicle are steered to a direction selected by a direction selection means. Therefore, the vehicle can travel parallel to the selected direction.

However, at the parallel traveling mode, the vehicle described in the Patent Literature 1 can travel parallel to only the predetermined direction (for example, 8 directions) and cannot travel parallel to the other optional direction. For moving parallel to the desired direction, the vehicle must repeat the parallel traveling to the predetermined direction alternately.

Patent Literature 1: the Japanese Patent Laid Open Gazette 2008-13045

DISCLOSURE OF INVENTION

Problems to Be Solved by the Invention

The present invention is provided in consideration of the above problems, and the purpose of the present invention is to provide a vehicle which can travel parallel to an optional direction easily.

Means for Solving the Problems

The above-mentioned problems are solved by the following means.

According to the present invention, a vehicle includes
wheels including two front wheels and two rear wheels,
steering actuators connected respectively to the wheels and steering the wheels,
driving actuators respectively connected to the wheels and driving the wheels,
a first steering operation member which can be operated by being tilted to an optional direction so as to command the action of the steering actuators,
a driving operation member commanding the action of the driving actuators, and
a control means which steers the wheels to a direction to which the first steering, operation member is tilted when the first steering operation member is tilted, and drives the wheels based on the operation amount of the driving operation member when the driving operation member is operated.

According to the present invention,
the first steering operation member can be operated by being twisted to an optional direction, and
the control means steers the wheels so as to turn to the direction to which the first steering operation member is twisted centering on a predetermined first turning center when the first steering operation member is twisted while not being tilted.

According to the present invention, when the first steering operation member is tilted while being twisted, the control means determines a second turning center based on the tilt direction and tilt angle of the first steering operation member, and steers the wheels so as to turn to the direction to which the first steering operation member is twisted centering on the second turning center.

According to the present invention, the vehicle further includes
a second steering operation member commanding the action of the steering actuators, and
a control means which calculates the steering angles of the front wheels at which the steering is permitted around a turning center determined by operation amount of the second steering operation member and actuates the steering actuators connected to the front wheels so as to make the steering angles of the front wheels be the calculated steering angles.

According to the present invention, the steering actuators can steer the front wheels for not less than 90°.

According to the present invention, the control means calculates the speed of the wheels at which the wheels can turn centering on the turning center without slipping about a ground surface based on the operation amount of the second steering operation member and the operation amount of the driving operation member, and actuates the driving actuators so as to make the speed of the driving wheels be the calculated speed.

According to the present invention, the control means restricts the calculated speed not more than the predetermined value.

According to the present invention,
a control amount of a controlled object including a dead time which is a delay time of response about an input is inputted into an inverse model of a transfer function of the controlled object from which the dead time is removed so as to calculate a first output value,
the first output value is subtracted from the operation amount of the controlled object so as to calculate a second output value,
the second output value is inputted into the transfer function of the controlled object from which the dead time is removed so as to calculate a third output value,
the third output value is subtracted from a deviation so as to calculate a revised deviation, and
feedback control is performed based on the revised deviation.

According to the present invention,
a control amount of a controlled object including a dead time which is a delay time of response about an input is inputted into an inverse model of a transfer function of the controlled object from which the dead time is removed so as to calculate a first output value, the first output value is subtracted from the operation amount of the controlled object so as to calculate a second output value, the second output value is inputted into the transfer function of the controlled object from which the dead time is removed so as to calculate a third output value, the third output value is inputted into a filter through which only a specific frequency component can pass so as to calculate a fourth output value the fourth output value is subtracted from a deviation so as to calculate a revised deviation, and feedback control is performed based on the revised deviation.

Effect of the Invention

The present invention constructed as the above brings the following effects.

According to the present invention, only by tilting the steering operation member to a desired direction, the plurality of the wheels can be steered to the direction. In this state, by operating the driving operation member, the vehicle can travel to the direction. Therefore, the vehicle can move parallel to an optional direction easily by easy operation.

According to the present invention, only by twisting the steering operation member to a desired direction, the wheels can be steered so as to turn to the direction to which the steering operation member is twisted centering on the predetermined first turning center. In this state, by operating the driving operation member, the vehicle can turn to the direction. Therefore, the vehicle can turn centering on the predetermined first turning center easily by easy operation.

According to the present invention, only by tilting the steering operation member to a desired direction while twisting the steering operation member, the second turning center can be controlled optionally and the wheels can be steered so as to turn to the direction to which the steering operation member is twisted centering on the second turning center. In this state, by operating the driving operation member, the vehicle can turn to the direction. Therefore, the vehicle can turn centering on the second turning center easily by easy operation.

According to the present invention, the vehicle can turn easily centering on an optional turning center. Since the two front wheels can be steered independently, the steering angles of the two front wheels are not limited mechanically, whereby the turning radius can be made small.

According to the present invention, by steering the front wheels for not less than 90°, the turning centering on the position inside the width of the vehicle and the turning centering on the center of the width of the vehicle (pivotal turning) can be performed.

According to the present invention, based on the operation amount of the driving operation member, the speeds of the driving wheels can be controlled so as to prevent the driving wheels from slipping about the ground surface. Therefore, the pivot turning can be performed stably without damaging the ground surface (lawns, cultivated field and the like) by the turning and preventing the damage of the driving wheels.

According to the present invention, by restricting each of the calculated speeds not more than the predetermined value, the defect caused by the over-speed of the driving actuators can be prevented.

According to the present invention, in the feedback control of the controlled object including the dead time, the dead time of the controlled object can be compensated and pushed out from a feedback loop. Therefore, even if the control gain is large, the control is stable. Accordingly, the control gain can be set large so as to improve the responsibility of the control amount. Since the dead time of the controlled object is not included in the control parameter of the compensator, the dead time can be compensated even if the dead time is changed by aged variation or the like or an error is generated in the modeling of the dead time, whereby the control can be performed stably.

According to the present invention, in the feedback control of the controlled object including the dead time, the dead time of the controlled object can be compensated and pushed out from a feedback loop. Therefore, even if the control gain is large, the control is stable. Accordingly, the control gain can be set large so as to improve the responsibility of the control amount. Since the dead time of the controlled object is not included in the control parameter of the compensator, the dead time can be compensated even if the dead time is changed by aged variation or the like or an error is generated in the modeling of the dead time, whereby the control can be performed stably. When the actual model of the controlled object is changed by aged variation or the like or when an error is generated in the modeling of the controlled object, any offset is not generated between the target value and the control amount.

BRIEF DESCRIPTION OF DRAWINGS

[FIG. 4] It is a schematic drawing showing a state of steering in normal steering mode. (a) is a schematic drawing showing the state of rightward steering, and (b) is a schematic drawing showing the state of leftward steering.

[FIG. 11] It is a schematic drawing showing a state of parallel movement in special steering mode. (a) is a schematic drawing showing the state of forward rightward parallel movement, and (b) is a schematic drawing showing the state of rightward parallel movement.

[FIG. 12] It is a schematic drawing showing a state of turning centering on a predetermined turning center in special steering mode. (a) is a schematic drawing showing the state of clockwise turning, and (b) is a schematic drawing showing the state of counterclockwise turning.

[FIG. 13] It is a schematic drawing showing a state of turning centering on an optional turning center in special steering mode. (a) is a schematic drawing showing the case in which a joystick is tilted rightward, and (b) is a schematic drawing showing the case in which a joystick is tilted rightward widely.

[FIG. 14] It is a schematic drawing showing a state of turning centering on an optional turning center in special steering mode. (a) is a schematic drawing showing the case in which a joystick is tilted leftward, and (b) is a schematic drawing showing the case in which a joystick is tilted leftward widely.

[FIG. 17] (a) is a block drawing of a feedback control device according to another embodiment of the present invention, and (b) is a block drawing of a feedback control device 201 according to another embodiment of the present invention.

[FIG. 19] (a) is a block drawing of the case in which PID control is applied on controlled objects including dead time, and (b) is a block drawing of the case in which (a) is converted equivalently.

[FIG. 20] (a) is a block drawing estimating disturbance, and (b) is a block drawing in which the dead time is pushed out from a feedback loop.

[FIG. 21] (a) is a graph showing response in the case in which L is changed by compensation of the dead time of smith, and (b) is a graph showing response in the case in which L is changed by compensation of the dead time of a disturbance observer.

[FIG. 22] (a) is a block drawing of a dead time compensator of the disturbance observer considering an error of a model according to an embodiment of the present invention, and (b) is a block drawing of a dead time compensator of the disturbance observer considering the error of the model according to another embodiment of the present invention.

[FIG. 28] (a) is a graph showing the results of the swash plate control of μ limitation in the case in which the dead time compensator of the disturbance observer does not exist, and (b) is a graph showing the results of the swash plate control of μ limitation in the case in which the dead time compensator of the disturbance observer exists.

[FIG. 29] (a) is a block drawing of the conventional case in which PID control is applied on controlled objects including dead time, (b) is a graph showing a target value and a control amount in the case in which a control gain of a PID controller is set large in FIG. 29(a), and (c) is a graph showing a target value and a control amount in the case in which the control gain of the PID controller is set small in FIG. 29(a).

[FIG. 30] (a) is a block drawing of the conventional case in which a compensator of the dead time of smith is used so as to compensate the dead time, (b) is a block drawing of the case in which (a) is converted equivalently, and (c) is a graph showing target value and control value in the case in which an error is generated in a control parameter of the compensator of the dead time of smith.

DESCRIPTION OF NOTATIONS 1 vehicle
21 left front wheel (front wheel, wheel)
22 left front wheel driving motor (driving actuator)
23 left front wheel steering motor (steering actuator)
31 right front wheel (front wheel, wheel)
32 right front wheel driving motor (driving actuator)
33 right front wheel steering motor (steering actuator)
41 left rear wheel (rear wheel, wheel)
42 left rear wheel driving motor (driving actuator)
43 left rear wheel steering motor (steering actuator)
51 right rear wheel (rear wheel, wheel)
52 right rear wheel driving motor (driving actuator)
53 right rear wheel steering motor (steering actuator)
62 steering wheel (second steering operation member)
63 accelerator pedal (driving operation member)
64 joystick (first steering operation member)
65 selector switch
100 controller (control means)

The Best Mode For Carrying Out The Invention

Explanation will be given on a vehicle 1 which is an embodiment of a vehicle according to the present invention. The vehicle according to the present invention is not limited to the vehicle 1 according to this embodiment and may alternatively be a construction vehicle, an agricultural vehicle or an industrial vehicle.

Figure 1:
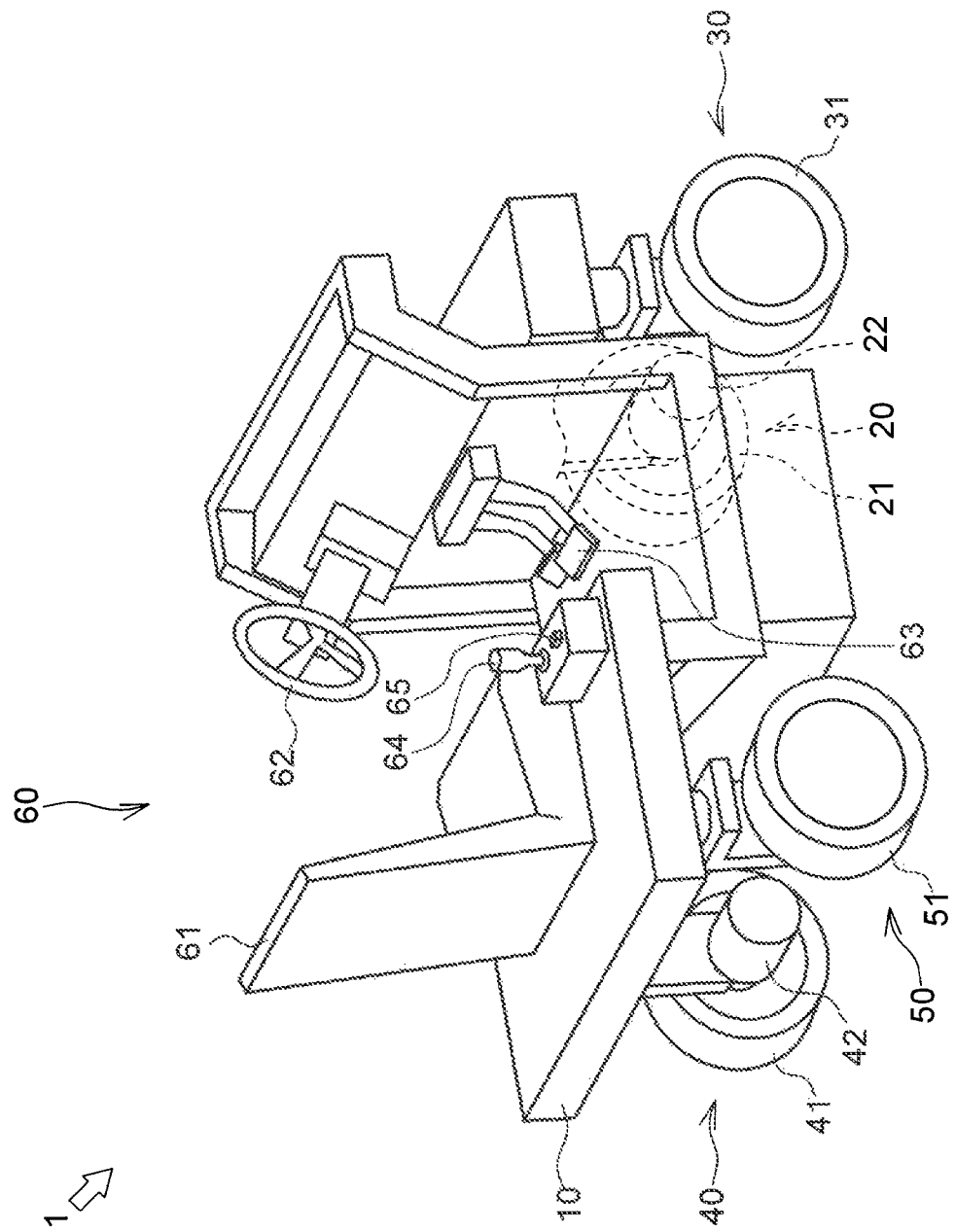
[FIG. 1] It is a perspective view of entire construction of a vehicle according to a first embodiment of the present invention.

As shown in FIG. 1, the vehicle 1 travels by power generated by an electric motor. The vehicle 1 includes a vehicle body 10, a left front wheel mechanism 20, a right front wheel mechanism 30, a left rear wheel mechanism 40, a right rear wheel mechanism 50, an operation part 60, and a controller 100 (see FIG. 3).

The vehicle body 10 constitutes the main structure of the vehicle 1. The vehicle body 10 is constructed by combining plate members, pipe members and the like. In the vehicle body 10, a capacitor supplying electric power to members of the vehicle 1 and the like are provided.

Figure 2:
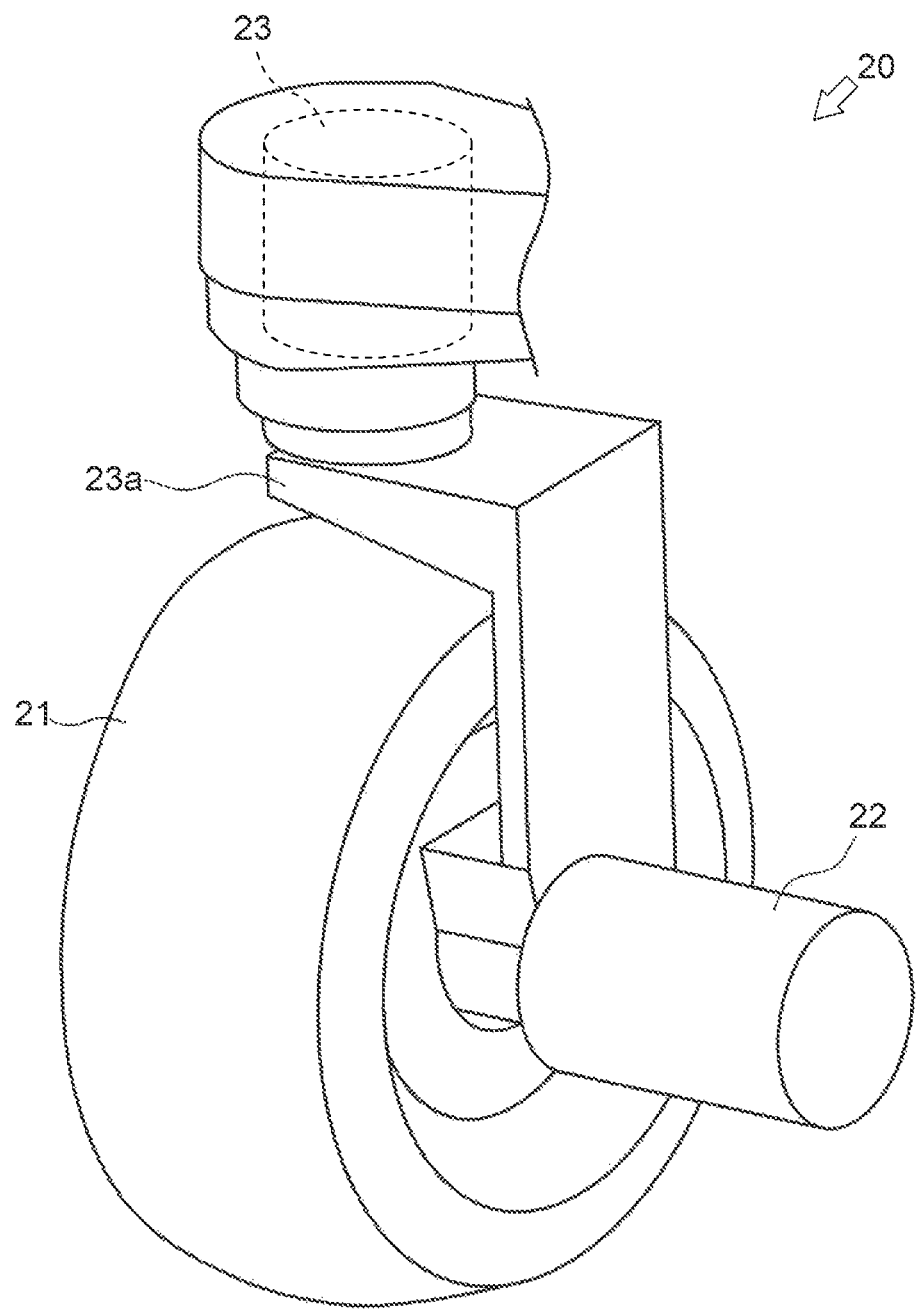
[FIG. 2] It is a perspective view of a left wheel mechanism.
Figure 3:
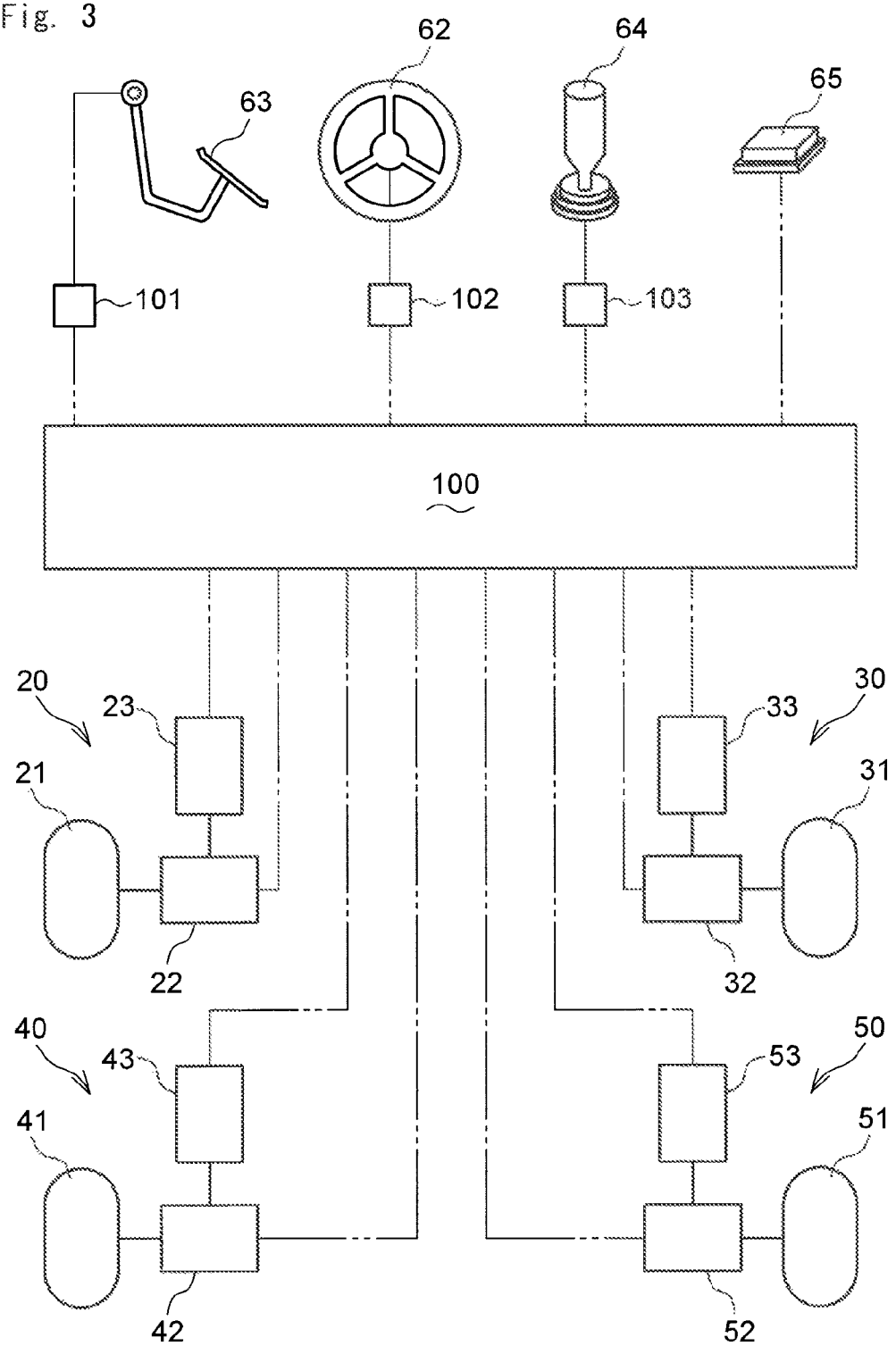
[FIG. 3] It is a schematic drawing of construction concerned with the control of the vehicle.

As shown in FIGS. 1 to 3, the left front wheel mechanism 20 makes the vehicle 1 travel along an optional direction. The left front wheel mechanism 20 is arranged in lower portion of the left front end of the vehicle body 10. The left front wheel mechanism 20 mainly includes a left front wheel 21, a left front wheel driving motor 22 and a left front wheel steering motor 23.

The left front wheel 21 is an embodiment of a front wheel, and supports the vehicle body 10 and is rotatively driven so as to make the vehicle body 10 travel.

As shown in FIGS. 2 and 3, the left front wheel driving motor 22 is an embodiment of a driving actuator, and drives rotatively the left front wheel 21. An output shaft (not shown) of the left front wheel driving motor 22 is connected to the left front wheel 21. The driving power of the left front wheel driving motor 22 is transmitted through the output shaft of the left front wheel driving motor 22 to the left front wheel 21, and the left front wheel 21 is rotatively driven by the driving power.

The left front wheel steering motor 23 is an embodiment of a steering actuator, and steers the left front wheel 21. An output shaft (not shown) of the left front wheel steering motor 23 is arranged downward along the vertical direction, and connected through a reduction mechanism (not shown) to an upper end of a bracket 23a (see FIG. 2). The lower end of the bracket 23a is connected to the left front wheel 21 and the left front wheel driving motor 22. The driving power of the left front wheel steering motor 23 is transmitted through the output shaft of the left front wheel steering motor 23 and the reduction mechanism to the bracket 23a. By the driving power, the bracket 23a is rotated centering on the vertical axis. With the bracket 23a, the left front wheel 21 and the left front wheel driving motor 22 are rotated integrally about the vehicle body 10, whereby the left front wheel 21 is steered.

As shown in FIGS. 1 to 3, the right front wheel mechanism 30 makes the vehicle 1 travel along an optional direction. The right front wheel mechanism 30 is arranged in lower portion of the right front end of the vehicle body 10. The right front wheel mechanism 30 mainly includes a right front wheel 31, a right front wheel driving motor 32 and a right front wheel steering motor 33. The right front wheel 31 is an embodiment of the front wheel, the right front wheel driving motor 32 is an embodiment of the driving actuator, and the right front wheel steering motor 33 is an embodiment of the steering actuator. Because the construction and action mode of the right front wheel mechanism 30 is substantially the same as those of the left front wheel mechanism 20, explanation thereof is omitted.

As mentioned above, the left front wheel 21 and the right front wheel 31 are steered respectively by the left front wheel steering motor 23 and the right front wheel steering motor 33. Namely, the steering angles of the left front wheel 21 and the right front wheel 31 are not limited mechanically to each other, whereby each front wheel can be steered for an optional steering angle. By steering the left front wheel 21 and the right front wheel 31 respectively by the left front wheel steering motor 23 and the right front wheel steering motor 33, each front wheel can be steered for a steering angle which is not less than 90°.

The left rear wheel mechanism 40 makes the vehicle 1 travel along an optional direction. The left rear wheel mechanism 40 is arranged in lower portion of the left rear end of the vehicle body 10. The left rear wheel mechanism 40 mainly includes a left rear wheel 41, a left rear wheel driving motor 42 and a left rear wheel steering motor 43. The left rear wheel 41 is an embodiment of a rear wheel, the left rear wheel driving motor 42 is an embodiment of the driving actuator, and the left rear wheel steering motor 43 is an embodiment of the steering actuator. Because the construction and action mode of the left rear wheel mechanism 40 is substantially the same as those of the left front wheel mechanism 20, explanation thereof is omitted.

The right rear wheel mechanism 50 makes the vehicle 1 travel along an optional direction. The right rear wheel mechanism 50 is arranged in lower portion of the right rear end of the vehicle body 10. The right rear wheel mechanism 50 mainly includes a right rear wheel 51, a right rear wheel driving motor 52 and a right rear wheel steering motor 53. The right rear wheel 51 is an embodiment of a rear wheel, the right rear wheel driving motor 52 is an embodiment of the driving actuator, and the right rear wheel steering motor 53 is an embodiment of the steering actuator. Because the construction and action mode of the right rear wheel mechanism 50 is substantially the same as those of the left front wheel mechanism 20, explanation thereof is omitted.

Hereinafter, for convenience of explanation, the left front wheel 21 and the right front wheel 31 are generally referred to as "front wheels" simply, the left rear wheel 41 and the right rear wheel 51 are generally referred to as "rear wheels" simply, and the left front wheel 21, the right front wheel 31, the left rear wheel 41 and the right rear wheel 51 are generally referred to as "wheels" simply. The left front wheel driving motor 22, the right front wheel driving motor 32, the left rear wheel driving motor 42 and the right rear wheel driving motor 52 are generally referred to as "driving motors" simply, and the left front wheel steering motor 23, the right front wheel steering motor 33, the left rear wheel steering motor 43 and the right rear wheel steering motor 53 are generally referred to as "steering motors" simply.

As shown in FIG. 1, an operator gets in the operation part 60 so as to operate the vehicle 1. The operation part 60 is arranged at the substantially center of the vehicle body 10 in the longitudinal direction. The operation part 60 mainly includes a seat 61, a steering wheel 62, an accelerator pedal 63, a joystick 64, and a selector switch 65.

An operator sits on the seat 61. The seat 61 is arranged behind the operation part 60.

The steering wheel 62 is an embodiment of a second steering operation member and is an operation member for steering the vehicle 1. The steering wheel 62 is formed substantially circularly and is rotatively operated by an operator. The steering wheel 62 is arranged at a position in the front portion of the operation part 60 at which an operator sitting on the seat 61 can operate the steering wheel 62.

The accelerator pedal 63 is an embodiment of a driving operation member and is an operation member for making the vehicle 1 travel. The accelerator pedal 63 is arranged at a position in the front portion of the operation part 60 and below the steering wheel 62 at which an operator sitting on the seat 61 can operate the accelerator pedal 63 with a foot.

The joystick 64 is an embodiment of a first steering operation member and is an operation member for steering the vehicle 1. The joystick 64 is arranged at a position at the side of the seat 61 at which an operator sitting on the seat 61 can operate the joystick 64. The lower portion of the joystick 64 is supported rotatably, and the upper portion thereof is tilted toward an optional direction and is rotated (twisted) centering on the lengthwise direction thereof so as to operate the joystick 64.

The selector switch 65 selects one of the steering wheel 62 and the joystick 64 as the operation member for steering the vehicle 1. The selector switch 65 is arranged at a position at the side of the seat 61 at which an operator sitting on the seat 61 can operate the selector switch 65. In this embodiment, the selector switch 65 is arranged near the joystick 64. The selector switch 65 according to this embodiment is a push button switch. However, the present invention is not limited thereto, and various kinds of switches such as a toggle switch and a slide switch may be employed.

As shown in FIG. 3, the controller 100 is an embodiment of a control means, and controls the driving and steering of the wheels based on the operation of operation member. The controller 100 is arranged at a suitable position in the vehicle body 10. Concretely, the controller 100 may be constructed by connecting a CPU, a ROM, a RAM, A HDD and the like through a bus, or may alternatively be constructed by a one-chip LSI or the like. In the controller 100, various programs and data for controlling the driving and steering of the wheels are stored. Based on the programs and the like, the controller 100 controls the driving and steering of the wheels. The controller 100 is mainly connected to an accelerator operation amount sensor 101, a steering operation amount sensor 102, a joystick operation amount sensor 103, the selector switch 65, the driving motors, and the steering motors.

The accelerator operation amount sensor 101 detects an operation amount A of the accelerator pedal 63, in more detail, the rotation angle of the accelerator pedal 63 rotated by an operator. The controller 100 can obtain the detection signal of the operation amount A of the accelerator pedal 63 detected by the accelerator operation amount sensor 101. The controller 100 can calculate a target speed vt which is a target of the vehicle 1 based on the operation amount A of the accelerator pedal 63.

The steering operation amount sensor 102 detects the operation amount of the steering wheel 62, in more detail, a rotation angle $\theta$ of the steering wheel 62 rotated by an operator. The controller 100 can obtain the detection signal of the rotation angle $\theta$ of the steering wheel 62 detected by the steering operation amount sensor 102. When the rotation angle $\theta$ of the steering wheel 62 is determined, a turning radius r of turning of the vehicle 1 is determined. In this embodiment, the turning radius r is the distance between a turning center Z and the intermediate point between the left rear wheel 41 and the right rear wheel 51 (see FIG. 5).

The joystick operation amount sensor 103 detects the operation amount of the joystick 64, in more detail, the tilt angle and tilt direction of the joystick 64 tilted by an operator and the rotational direction of the joystick 64 rotated (twisted) by an operator. The controller 100 can obtain the detection signal of the operation amount of the joystick 64 detected by the joystick operation amount sensor 103.

The controller 100 is connected to the selector switch 65 and can detect a detection signal which means that the selector switch 65 is operated.

The controller 100 is connected to the driving motors, and can controls the driving of the driving motors, in more detail, the rotational direction and the rotational speed of the driving motors. By the control, the controller 100 can controls the driving of the driving motors, in its turn, can make the vehicle 1 travel at an optional speed.

The controller 100 is connected to the steering motors, and can controls the driving of the steering motors, in more detail, the rotational direction and the rotational speed of the steering motors. By the control, the controller 100 can control the steering of the wheels, in its turn, can make the vehicle 1 steer to an optional direction.

In the vehicle 1 constructed as mentioned above, based on the operation of the selector switch 65 by an operator, the controller 100 selects one of the steering wheel 62 and the joystick 64 as an operation member for operating the vehicle 1. In the case in which the steering wheel 62 is selected by the selector switch 65 (hereinafter, this case is simply referred to as "normal steering mode"), the controller 100 can control the steering of the wheels based on the operation of the steering wheel 62. In the case in which the joystick 64 is selected by the selector switch 65 (hereinafter, this case is simply referred to as "special steering mode"), the controller 100 can control the steering of the wheels based on the operation of the joystick 64.

The controller 100 can control the driving of the wheels based on the operation of the accelerator pedal 63. In more detail, the controller 100 drives the wheels when the accelerator pedal 63 is operated and increases the rotational speed of the wheels following increase of the operation amount of the accelerator pedal 63.

Explanation will be given on the control mode of the wheels by the controller 100.

Firstly, explanation will be given on the case in which the normal steering mode is selected by the selector switch 65. In the normal steering mode, the vehicle 1 is steered by operating the steering wheel 62.

As shown in FIG. 4, in the normal steering mode, when the steering wheel 62 is rotated clockwise, the left front wheel 21 and the right front wheel 31 are steered rightward. In more detail, the left front wheel 21 and the right front wheel 31 are steered independently so as to turn concentrically. In this state, by operating the accelerator pedal 63, the vehicle 1 can turn rightward forward.

When the steering wheel 62 is rotated counterclockwise, the left front wheel 21 and the right front wheel 31 are steered leftward. In more detail, the left front wheel 21 and the right front wheel 31 are steered independently so as to turn concentrically. In this state, by operating the accelerator pedal 63, the vehicle 1 can turn leftward forward.

As mentioned above, in the normal steering mode, the front wheels of the vehicle 1 (the left front wheel 21 and the right front wheel 31) can be steered based on the operation of the steering wheel 62. Namely, the vehicle 1 can travel with the operation sense similar to a general motorcar.

Explanation will be given on the case in which the normal steering mode is selected by the selector switch 65 in more detail.

Conventionally, an art of a vehicle is well known in which a pair of left and right wheels can be steered independently.

A concrete example of such the vehicle includes a pair of main driving wheels (rear wheels), a pair of hydraulic transmissions respectively driving the pair of the main driving wheels, and a pair of operation levers respectively operating the pair of the hydraulic transmissions.

In this construction, in the vehicle, by operating the pair of the operation levers oppositely, the pair of the main driving wheels can be driven along the opposite directions. Therefore, the vehicle can turn centering on the lateral middle point between the main driving wheels (turn pivotally).

However, in the vehicle, the pair of the operation levers must be operated respectively so as to turn, whereby it is disadvantageous that the operation is complicated.

Then, the vehicle 1 is provided which can turn pivotally by easy operation.

In the vehicle 1 constructed as mentioned above, the controller 100 can control the steering of each of the front wheels independently based on the operation of the steering wheel 62. The controller 100 can control the driving of each of the wheels independently based on the operation of the accelerator pedal 63.

Figure 5:
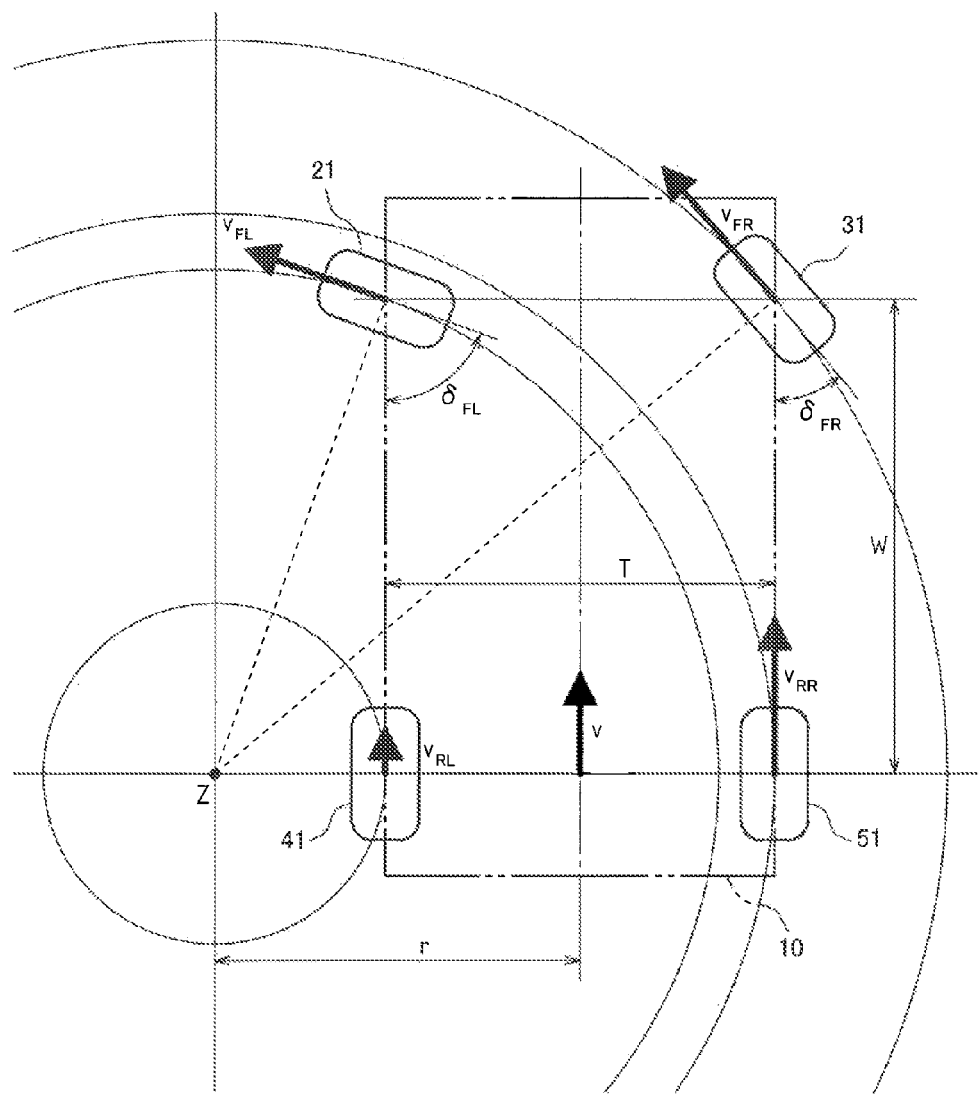
[FIG. 5] It is a schematic drawing showing relation among turning radius of the vehicle, steering angle of front wheels and speed of each wheel.

In this case, the normal steering mode is selected by the selector switch 65, the vehicle 1 turns by steering only the front wheels. Therefore, as shown in FIG. 5, the turning center Z is arranged on a line linking the grounding point of the left rear wheel 41 to the grounding point of the right rear wheel 51. By calculating the turning radius r based on the rotation angle $\theta$ of the steering wheel 62, the position of the turning center Z is found based on the calculated turning radius r.

Explanation will be given on a method for calculating the steering angle of the front wheels and the speed of the wheels in the case in which the vehicle 1 turns with the turning radius r referring to FIGS. 5 to 9.

As shown in FIG. 5, for smooth turning of the vehicle 1 with the turning radius r, the locus of the left front wheel 21 and the right front wheel 31 at the time of turning must be concentric. The steering angle $\delta_{FL}$ of the left front wheel 21 and the steering angle $\delta_{FR}$ of the right front wheel 31 for realizing it are respectively shown by relational expressions of Formulas 1 and 2.

$$\delta_{FL} = \frac{\pi}{2} - \tan^{-1}\left(\frac{r-T/2}{W}\right) \quad \text{[Formula 1]}$$

$$\delta_{FR} = \frac{\pi}{2} - \tan^{-1}\left(\frac{r+T/2}{W}\right) \quad \text{[Formula 2]}$$

In this case, T indicates a tread of the vehicle 1 (the distance between the centers of the left front wheel 21 and the right front wheel 31), and W indicates a wheelbase of the vehicle 1 (the distance between the front wheels and the rear wheels). In this embodiment, a tread T of the front wheels is the same as a tread T of the rear wheels.

As mentioned above, in the vehicle 1, only the front wheels are steered, therefore the steering angle of each of the left rear wheel 41 and the right rear wheel 51 is 0.

According to Formulas 1 and 2, the tread T and the wheelbase W are previously determined from the specification of the vehicle 1. Therefore, when the target turning radius r is determined, the steering angle $\delta_{FL}$ and the steering angle $\delta_{FR}$ are calculated based on the turning radius r.

Figure 6:
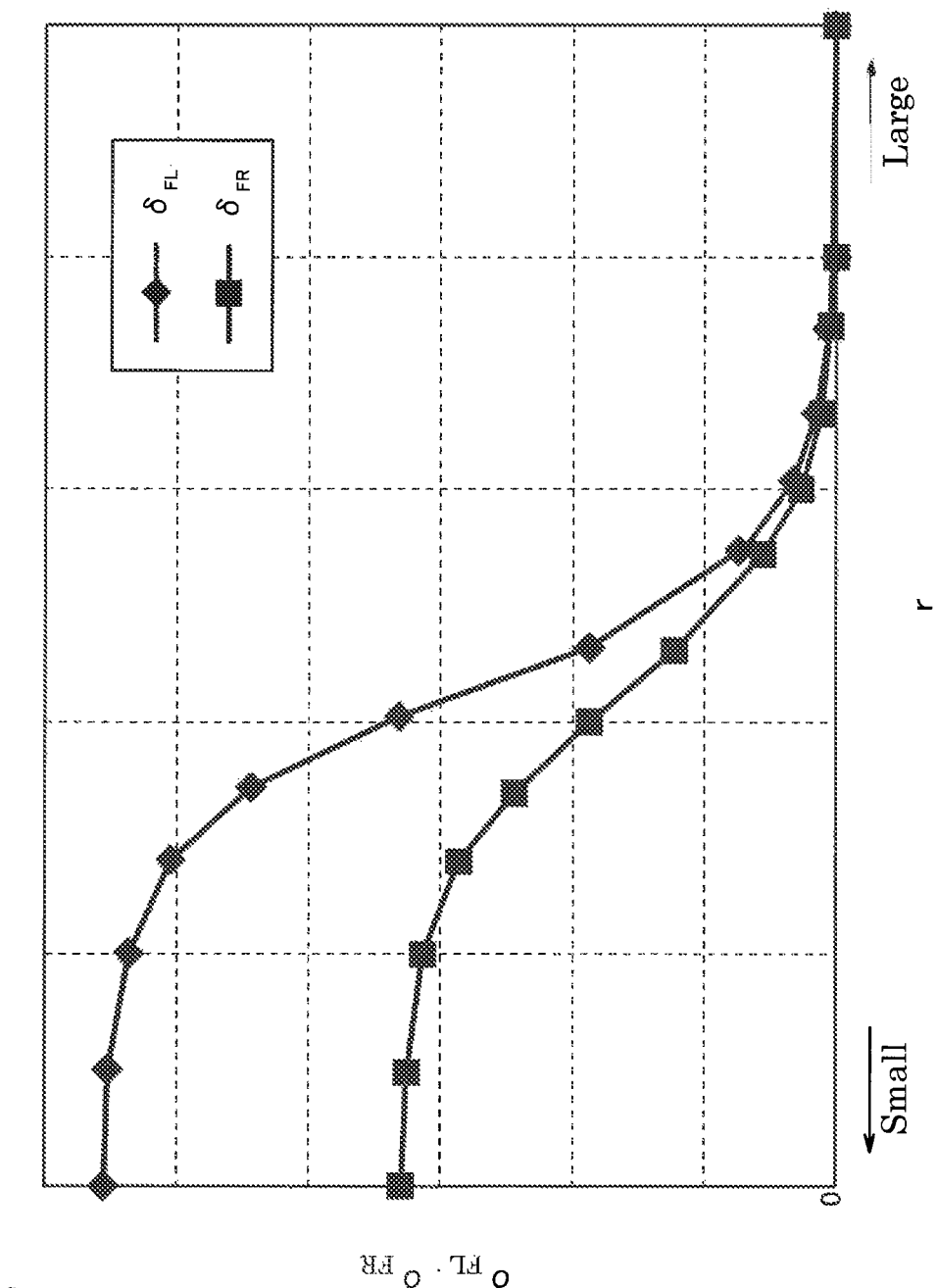
[FIG. 6] It is a diagram of an embodiment of a map showing the relation between the turning radius of the vehicle and the steering angle of the front wheels.

FIG. 6 shows an example of a map showing the relation between the turning radius r and the steering angle $\delta_{FL}$ and the steering angle $\delta_{FR}$ in the case in which the vehicle 1 is turned leftward (see FIG. 5). The axis of abscissas in FIG. 6 (the turning radius r) is a logarithmic axis. The map shows that the steering angle $\delta_{FL}$ and the steering angle $\delta_{FR}$ are increased following with the decrease of the turning radius r and the steering angle $\delta_{FL}$ and the steering angle $\delta_{FR}$ are decreased following with the increase of the turning radius r. The map also shows that the steering angle $\delta_{FL}$ of the left front wheel 21 arranged at the inner side in the turning direction is larger than the steering angle $\delta_{FR}$ of the right front wheel 31 arranged at the outer side in the turning direction. According to the map, the steering angles of the front wheels can be calculated from the turning radius r.

For making the wheels turn without slipping about the ground surface in the case in which the vehicle 1 (the vehicle body 10) turns at a speed v, the speed of each wheel must be set an optimum value. The speeds of each wheel for realizing it in the case in which (1) T/2≤r and in the case in which (2) 0<r≤T/2 are respectively explained by below relational expressions. The speeds of the left front wheel 21, the right front wheel 31, the left rear wheel 41 and the right rear wheel 51 are respectively referred to as $v_{FL}$, $v_{FR}$, $v_{RL}$ and $v_{RR}$. The speed of the wheel is the speed of the wheel about the grounding surface (see FIG. 5).

The speeds of the wheels in the case in which (1) T/2≤r, that is, in the case in which the turning center Z is arranged outside the width of the rear wheels, are respectively shown by relational expressions of Formulas 3 to 6.

$$v_{FL} = \frac{\sqrt{(r-T/2)^2 + W^2}}{r}v \quad \text{[Formula 3]}$$

$$v_{FR} = \frac{\sqrt{(r+T/2)^2 + W^2}}{r}v \quad \text{[Formula 4]}$$

$$v_{RL} = \frac{r-T/2}{r}v \quad \text{[Formula 5]}$$

$$v_{RR} = \frac{r+T/2}{r}v \quad \text{[Formula 6]}$$

The speeds of the wheels in the case in which (2) 0<r≤T/2, that is, in the case in which the turning center Z is arranged inside the rear wheels, are respectively shown by relational expressions of Formulas 7 to 10.

$$v_{FL} = \frac{\sqrt{(T/2-r)^2 + W^2}}{r}v \quad \text{[Formula 7]}$$

$$v_{FR} = \frac{\sqrt{(T/2+r)^2 + W^2}}{r}v \quad \text{[Formula 8]}$$

$$v_{RL} = -\frac{T/2-r}{r}v \quad \text{[Formula 9]}$$

$$v_{RR} = \frac{T/2+r}{r}v \quad \text{[Formula 10]}$$

According to Formulas 3 to 10, the tread T and the wheelbase W are previously determined from the specification of the vehicle 1. Therefore, when the target speed v of the vehicle body 10 is determined, the speeds of the wheels ($v_{FL}$, $v_{FR}$, $v_{RL}$ and $v_{RR}$) are calculated based on the speed v.

By employing wheel speed coefficients (a front wheel speed coefficient $C_{FL}$, a right front wheel speed coefficient $C_{FR}$, a left rear wheel speed coefficient $C_{RL}$ and a right rear wheel speed coefficient $C_{RR}$) which are generalized coefficients and the target speed vt calculated based on the operation amount A of the accelerator pedal 63, the speeds of the wheels are respectively shown by relational expressions of Formulas 11 to 14.

$$v_{FL} = C_{FL} \times v_t \quad \text{[Formula 11]}$$

$$v_{FR} = C_{FR} \times v_t \quad \text{[Formula 12]}$$

$$v_{RL} = C_{RL} \times v_t \quad \text{[Formula 13]}$$

$$v_{RR} = C_{RR} \times v_t \quad \text{[Formula 14]}$$

When the turning radius r is determined, the ratio of the wheel speed coefficients can be determined. According to Formulas 11 to 14, when the wheel speed coefficients and the target speed vt are determined, the speeds of the wheels can be calculated.

Figure 7:
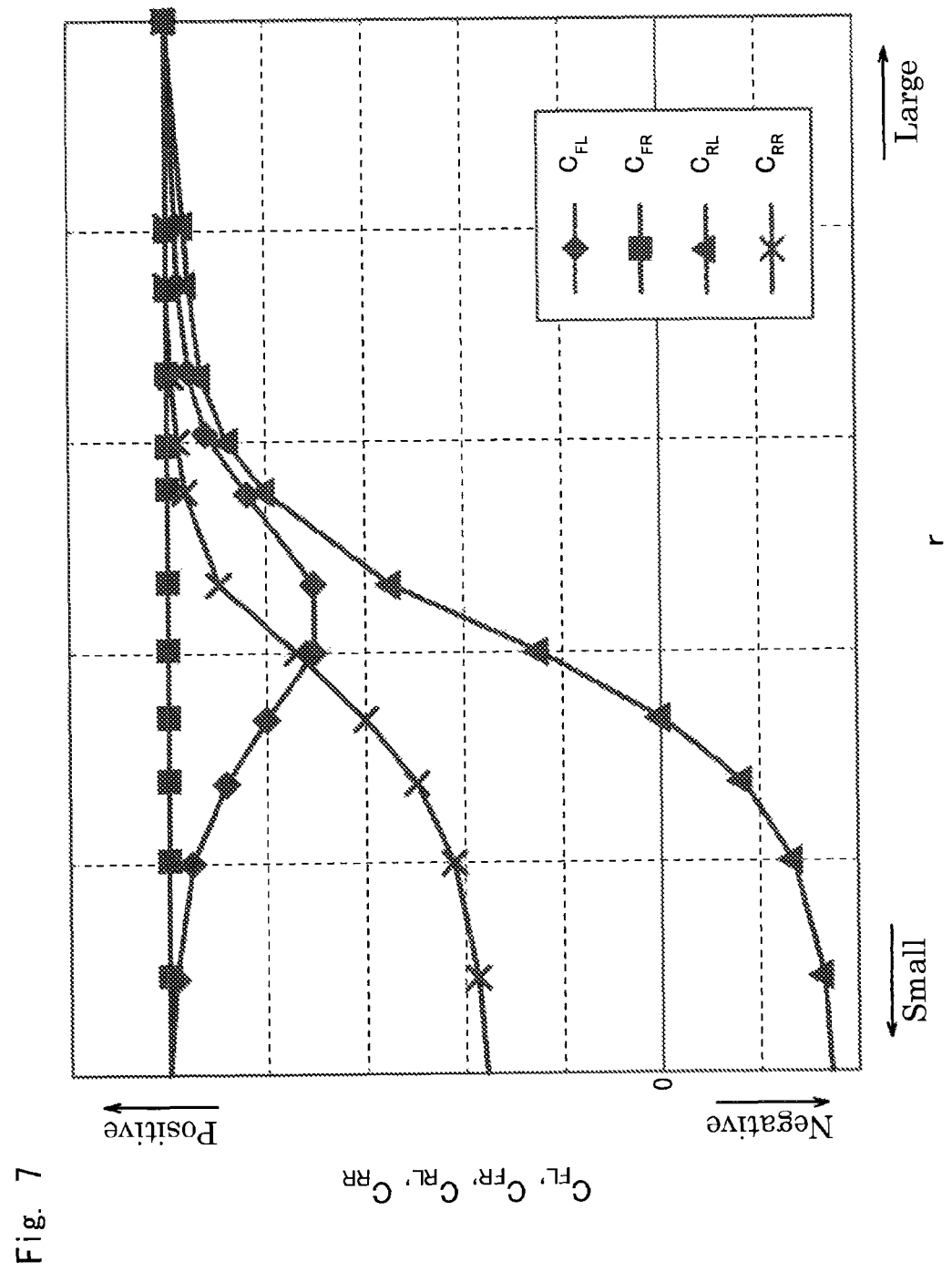
[FIG. 7] It is a diagram of an embodiment of a map showing the relation between the turning radius of the vehicle and a speed coefficient of each wheel.

FIG. 7 shows an example of a map showing the relation between the turning radius r and the wheel speed coefficients (the front wheel speed coefficient $C_{FL}$, the right front wheel speed coefficient $C_{FR}$, the left rear wheel speed coefficient $C_{RL}$ and the right rear wheel speed coefficient $C_{RR}$) in the case in which the vehicle 1 is turned leftward (see FIG. 5). The axis of abscissas in FIG. 7 (the turning radius r) is a logarithmic axis.

FIG. 7 shows the case in which the right front wheel speed coefficient $C_{FR}$ is set to be always 1. When the turning radius r is determined, the rate of each of the other wheel speed coefficients (the left front wheel speed coefficient $C_{FL}$, the left rear wheel speed coefficient $C_{RL}$ and the right rear wheel speed coefficient $C_{RR}$) to the right front wheel speed coefficient $C_{FR}$ is also determined, whereby the relation between the turning radius r and the wheel speed coefficients is the relation shown in FIG. 7. According to Formula 12, when the right front wheel speed coefficient $C_{FR}$ is set to be always 1, the speed $v_{FR}$ of the right front wheel 31 is always the target speed vt. By employing this map and Formulas 11 to 14, the speed of each wheel can be calculated from the turning radius r.

Figure 8:
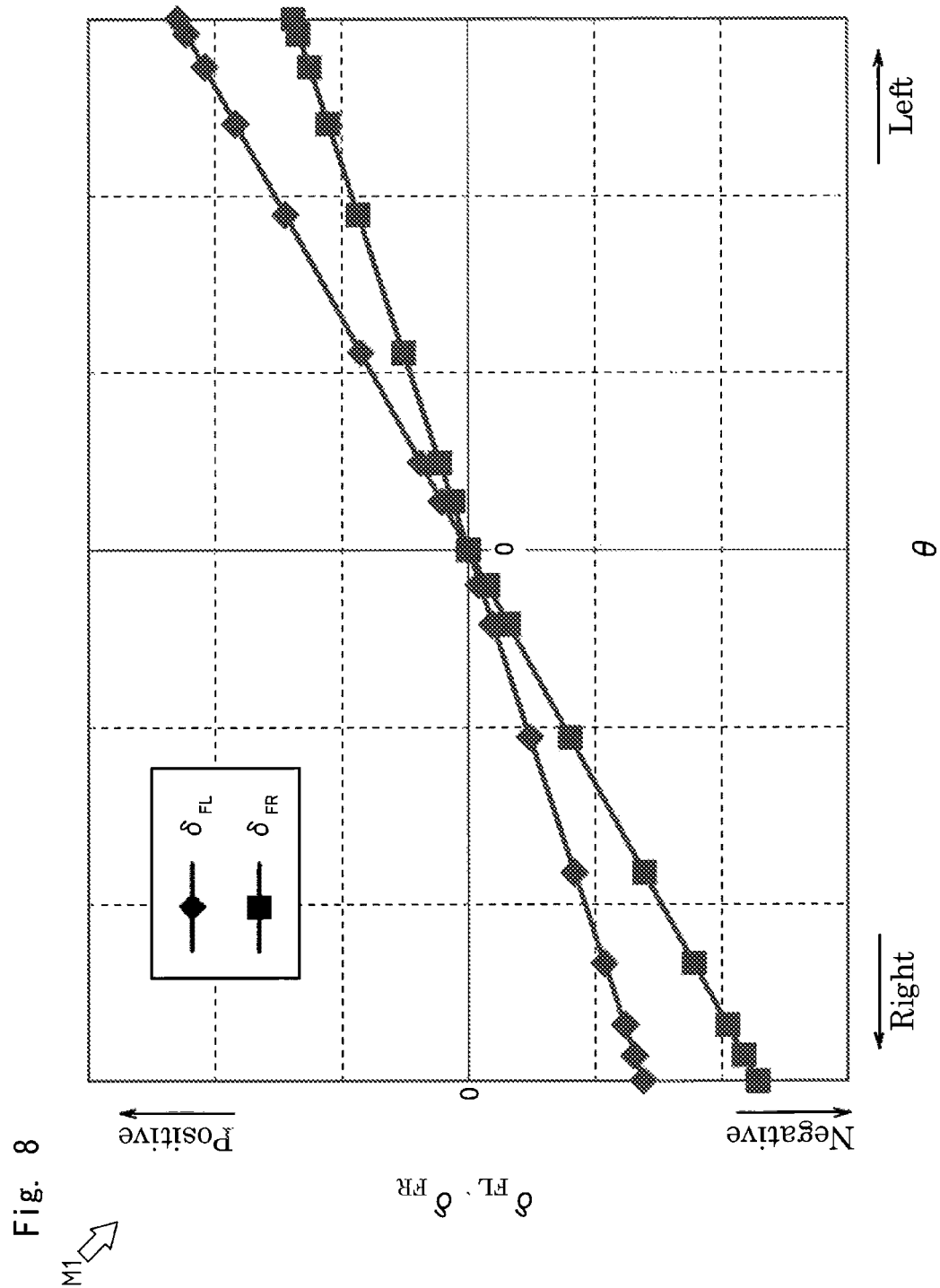
[FIG. 8] It is a diagram of a steering angle map showing relation between rotational angle of steering and the steering angle of the front wheels.

Up to now, explanation was given on the method for calculating the steering angle of the front wheels and the speed of the wheels based on the turning radius r and the maps shown in FIGS. 6 and 7. However, the turning radius r is determined based on the rotation angle θ of the steering wheel 62, whereby the steering angles of the front wheels and the speed of the wheels are calculated actually based on not the turning radius r but the rotation angle θ. FIG. 8 shows an example of a map showing the relation between the rotation angle θ of the steering wheel 62 and the steering angle $δ_{FL}$ and the steering angle $δ_{FR}$ in this case (hereinafter, simply referred to as "steering angle map M1"), and FIG. 9 shows an example of a map showing the relation between the rotation angle θ of the steering wheel 62 and the wheel speed coefficients (hereinafter, simply referred to as "wheel speed coefficient map M2").

In the steering angle map M1 shown in rig. 8, the steering angle $δ_{FL}$ and the steering angle $δ_{FR}$ in the case in which the steering wheel 62 is rotated leftward, that is, the front wheels are steered leftward are regarded as positive, and the steering angle $δ_{FL}$ and the steering angle $δ_{FR}$ in the case in which the steering wheel 62 is rotated rightward, that is, the front wheels are steered rightward are regarded as negative. By employing the steering angle map M1, the steering angles of the front wheels can be calculated from the rotation angle θ.

Figure 9:
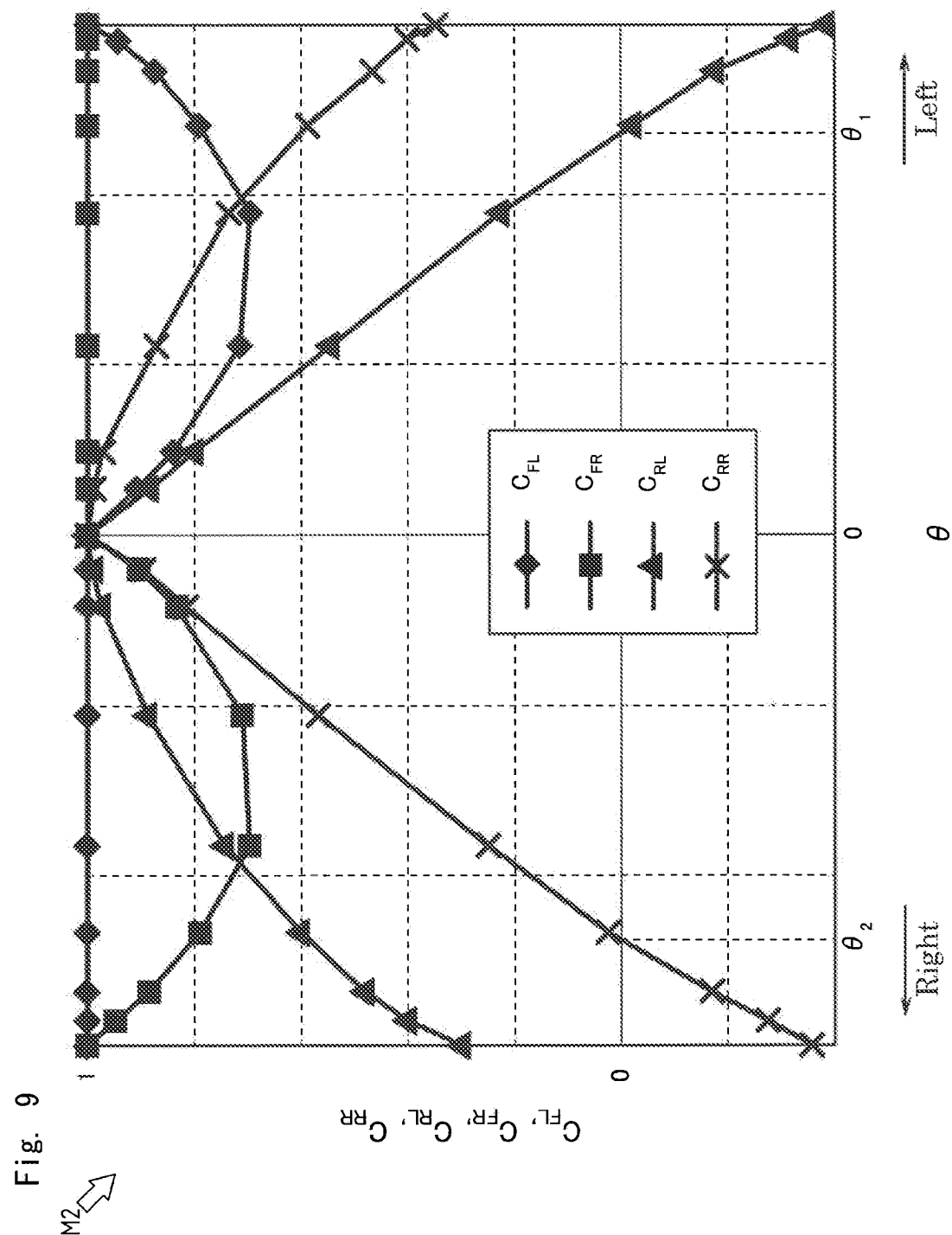
[FIG. 9] It is a diagram of a speed coefficient map showing relation between the rotational angle of the steering and the speed coefficient of each wheel.

In the wheel speed coefficient map M2 shown in FIG. 9, the right front wheel speed coefficient $C_{FR}$ in the case in which the steering wheel 62 is rotated leftward is set to be always 1, and the left front wheel speed coefficient $C_{FL}$ in the case in which the steering wheel 62 is rotated rightward is set to be always 1. By employing the wheel speed coefficient map M2 and Formulas 11 to 14, the speed of each wheel can be calculated from the rotation angle θ.

Explanation will be given on the control mode of the driving motors and the steering motors by the controller 100 referring to FIGS. 8 to 10.

Figure 10:
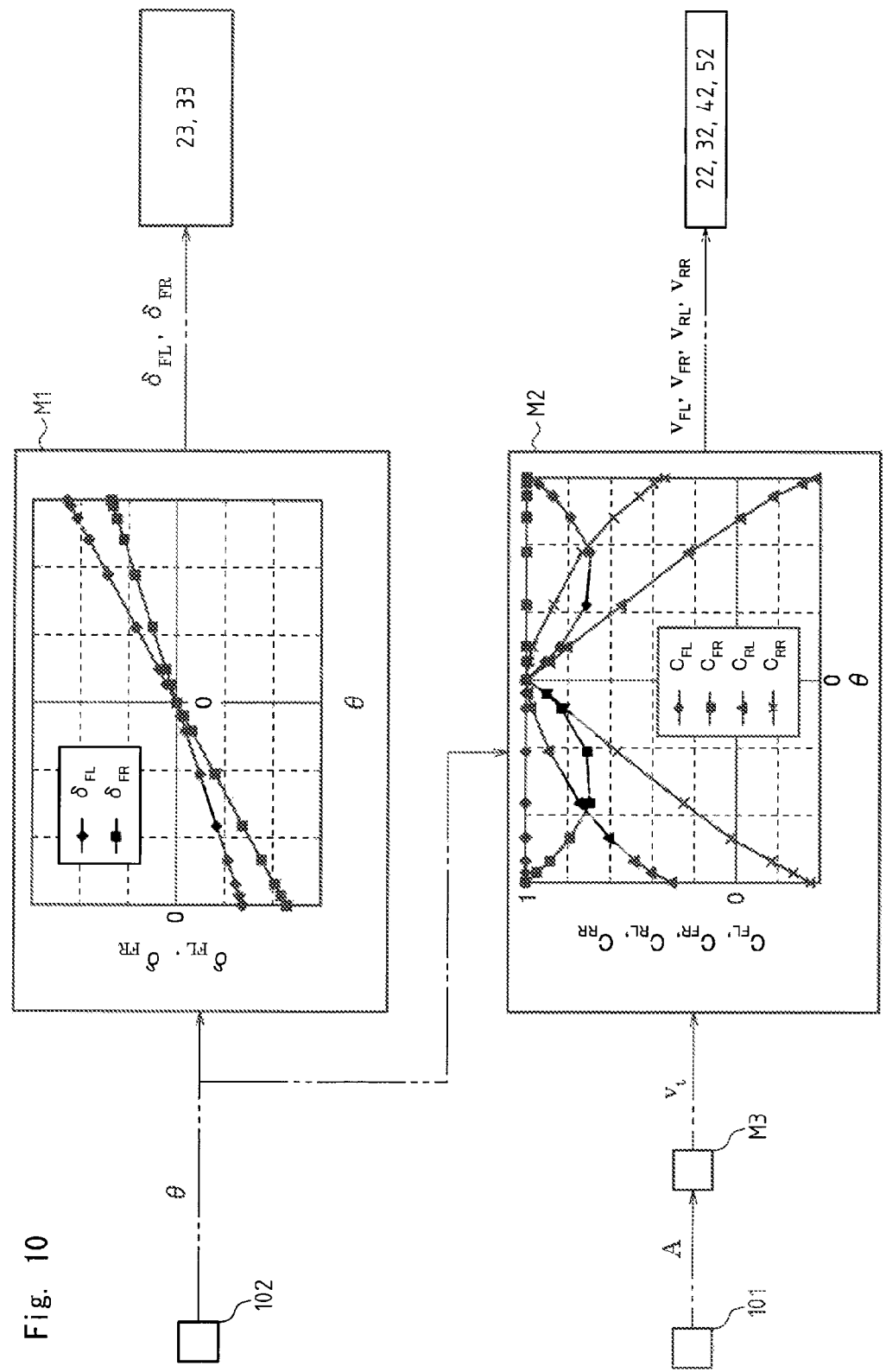
[FIG. 10] is a schematic drawing of control mode of each steering motor and each drive motor by a controller.

As shown in FIG. 10, the controller 100 obtains the rotation angle θ of the steering wheel 62 detected by the steering operation amount sensor 102, and calculates the steering angle $δ_{FL}$ and the steering angle $δ_{FR}$ respectively corresponding to the rotation angle θ based on the steering angle map M1.

The controller 100 controls the driving of the left front wheel steering motor 23 and the right front wheel steering motor 33 so as to make the steering angle $δ_{FL}$ and the steering angle $δ_{FR}$ of the left front wheel 21 and the right front wheel 31 be the steering angle $δ_{FL}$ and the steering angle $δ_{FR}$ calculated based on the steering angle map M1.

Accordingly, the steering angle $δ_{FL}$ and the steering angle $δ_{FR}$ are controlled to be the values calculated based on the steering angle map M1 so that the locus of the left front wheel 21 and the right front wheel 31 is concentric, whereby the vehicle 1 can turn smoothly with the turning radius r. The left front wheel 21 and the right front wheel 31 are steered respectively independently by the left front wheel steering motor 23 and the right front wheel steering motor 33, whereby the steering angles thereof ($δ_{FL}$ and $δ_{FR}$) are not limited mechanically by a linkage mechanism or the like. Accordingly, even if the turning center Z is arranged inside the width of the rear wheels, the vehicle can turn centering on the turning center Z. Especially, even if the turning center Z is arranged at the lateral middle point between the rear wheels, the turning (pivotal turning) can be performed.

The controller 100 calculates the target speed vt based on the operation amount A of the accelerator pedal 63 detected by the accelerator operation amount sensor 101 and a suitable map M3 showing the relation between the operation amount A and the target speed vt.

The controller 100 obtains the rotation angle θ of the steering wheel 62, and calculates the wheel speed coefficients ($C_{FL}$, $C_{FR}$, $C_{RL}$ and $C_{RR}$) respectively corresponding to the rotation angle θ based on the wheel speed coefficient map M2.

The controller 100 calculates the speeds of the wheels ($v_{FL}$, $v_{FR}$, $v_{RL}$ and $v_{RR}$) with the target speed vt calculated based on the map M3 and the wheel speed coefficients calculated based on the wheel speed coefficient map M2 from the relational expressions of Formulas 11 to 14.

The controller 100 controls the driving of the driving motors so as to make the speeds of the wheels be the calculated speeds ($v_{FL}$, $v_{FR}$, $v_{RL}$ and $v_{RR}$).

By calculating the speeds of the wheels with the wheel speed coefficients calculated based on the wheel speed coefficient map M2 and controlling the speeds of the wheels so as to make them be the calculated speeds, the wheels can turn without slipping about the ground surface. Accordingly, the turning of the vehicle can be prevented from damaging the ground surface (lawns, cultivated field and the like), and the damage of the wheels by the friction with the ground surface can be prevented.

In this embodiment, the wheel speed coefficient map M2 is set so that the right front wheel speed coefficient $C_{FR}$ is always 1 in the case in which the steering wheel 62 is rotated leftward (the vehicle turns leftward) and the left front wheel speed coefficient $C_{FL}$ is always 1 in the case in which the steering wheel 62 is rotated rightward (the vehicle turns rightward). Namely, the speed $v_{FR}$ of the right front wheel 31 is controlled to be always vt at the time of the leftward turning, and the speed $v_{FL}$ of the left front wheel 21 is controlled to be always vt at the time of the rightward turning.

In this case, when the vehicle 1 turns leftward, the radius of circle drawn by the right front wheel 31 is the largest in the radiuses of circles drawn by the wheels (see FIG. 5). Then, the speed $v_{FR}$ of the right front wheel 31 is the largest in the speeds of the wheels. Therefore, by controlling the speed $v_{FR}$ of the right front wheel 31 to be always the target speed vt as mentioned above, the speeds of the other wheels ($v_{FL}$, $v_{RL}$ and $v_{RR}$) are made not more than the target speed vt. By making each of the speeds of the wheels not more than the predetermined value (in this embodiment, the target speed vt), the defect (damage and the like) caused by the over-speed of the driving motors can be prevented. For example, by adopting driving motors which can be driven naturally at the speed not less than the target speed vt, the over-speed of the driving motors can be prevented.

When the vehicle 1 turns rightward, the radius of circle drawn by the left font wheel 21 is the largest in the radiuses of circles drawn by the wheels. Then, the speed $v_{FL}$ of the left front wheel 21 is the largest in the speeds of the wheels. Therefore, similarly to the above case of turning leftward, by controlling the speed $v_{FL}$ of the left front wheel 21 to be always the target speed vt as mentioned above, the speeds of the other wheels are made not more than the predetermined value (in this embodiment, the target speed vt), whereby the defect (damage and the like) caused by the over-speed of the driving motors can be prevented.

In this embodiment, each of the speed coefficients is set to be not more than 1. However, the present invention is not limited thereto, and each of the speed coefficients may alternatively be more than 1. For example, the speed of the vehicle body 10 may be always the target speed vt.

In this embodiment, the wheels are driven by the driving motors. However, the present invention is not limited thereto. For example, only the front wheels may be driven, only the rear wheels may be driven, or only one of the wheels may be driven.

In the case in which one of the rear wheels is driven, when the grounding, point of the driven wheel is in agreement with the turning center Z, the speed of the driven wheel is 0. The example thereof is the left rear wheel speed coefficient $C_{RL}$ at a rotational angle $\theta 1$ or the right rear wheel speed coefficient $C_{RR}$ at a rotational angle $\theta 2$ in the wheel speed coefficient map M2 shown in FIG. 9. In such a case, the vehicle 1 cannot travel with the construction of driving only the wheel, whereby the construction in which one of the rear wheels is driven cannot be employed.

As mentioned above, the vehicle 1 in this embodiment includes the plurality of the wheels including the two front wheels (the left front wheel 21 and the right front wheel 31), the steering actuators (the left front wheel steering motor 23 and the right front wheel steering motor 33) connected respectively to the front wheels so as to steer the front wheels, the steering wheel 62 directing the action of the steering actuators, and the controller 100 which calculates the steering angles of the front wheels ($\delta_{FL}$ and $\delta_{FR}$) at which the steering is permitted around the turning center Z determined by the rotational angle $\theta$ of the steering wheel 62 and actuates the steering actuators so as to make the steering angles of the front wheels be the calculated steering angles.

According to the construction, by easy operation of rotating the steering wheel 62, the vehicle can turn easily centering on an optional turning center Z. Since the two front wheels can be steered independently, the steering angles of the two front wheels are not limited mechanically, whereby the turning radius can be made small. Furthermore, the sense of rotational operation of the steering wheel 62 is similar to operation sense of a general motorcar, whereby an operator experienced in the operation of the motorcar can operate the vehicle 1 easily. Moreover, the turning radius r can be made small without steering the rear wheels so that any member for steering the rear wheels (steering actuators and the like) is not required, whereby the number and cost of the parts can be reduced.

The steering actuators can steer the front wheels for not less than 90°.

According to the construction, by steering the front wheels for not less than 90°, the turning centering on the position inside the rear wheels and the turning centering on the center between the rear wheels (pivotal turning) can be performed.

In the vehicle 1, in the plurality of the wheels including the two front wheels (the left front wheel 21 and the right front wheel 31), the plurality of the wheels are employed as the driving wheels (the left front wheel 21, the right front wheel 31, the left rear wheel 41 and the right rear wheel 51), the driving actuators (the left front wheel driving motor 22, the right front wheel driving motor 32, the left rear wheel driving motor 42 and the right rear wheel driving motor 52) respectively connected to the driving wheels so as to drive them, and the accelerator pedal 63 setting the target speed vt are provided, and the controller 100 calculates the speeds of the driving wheels ($v_{FL}$, $v_{FR}$, $v_{RL}$ and $v_{RR}$) at which the driving wheels can turn centering on the turning center Z without slipping about the ground surface based on the rotational angle $\theta$ and the operation amount A, and actuates the driving actuators so as to make the speeds of the driving wheels be the calculated speeds.

According to the construction, based on the operation amount A of the accelerator pedal 63, the speeds of the driving wheels can be controlled so as to prevent the driving wheels from slipping about the ground surface. Therefore, the pivot turning can be performed stably without damaging the ground surface (lawns, cultivated field and the like) by the turning and preventing the damage of the driving wheels.

The controller 100 restricts each of the calculated speeds not more than the predetermined value (the target speed vt).

According to the construction, by restricting each of the calculated speeds not more than the predetermined value, the defect caused by the over-speed of the driving actuators can be prevented.

In this embodiment, when the steering wheel 62 is operated in the normal steering mode, only the front wheels of the vehicle 1 are steered. However, the present invention is not limited thereto. It may alternatively be constructed that the rear wheels (the left rear wheel 41 and the right rear wheel 51) of the vehicle 1 are steered in addition to the front wheels, or only the rear wheels are steered. For example, when the steering wheel 62 is rotated clockwise, the front wheels are steered rightward and the rear wheels are steered leftward. Accordingly, the turning characteristics at the time of the steering of the vehicle 1 can be improved.

Next, explanation will be given on the case in which a special steering mode is selected by the selector switch 65. In the special steering mode, the vehicle 1 is steered by operating the joystick 64. The operation of the joystick 64 in the special steering mode includes (1) tilting the joystick 64 to an optional direction, (2) rotating (twisting) the joystick 64 to an optional direction without tilting it while the lengthwise direction thereof is regarded as the axis, and (3) tilting the joystick 64 to an optional direction and simultaneously rotating the joystick 64 to an optional direction while the lengthwise direction thereof is regarded as the axis.

Firstly, explanation will be given on the case of (1) tilting the joystick 64 to an optional direction.

As shown in FIG. 11(a), in the special steering mode, when the joystick 64 is tilted rightward forward, the steering motors are driven and the wheels are steered rightward forward (toward the same direction as that the joystick 64 is tilted). In this state, by operating the accelerator pedal 63, the driving motors are driven, whereby the vehicle 1 travels rightward forward while the vehicle body 10 keeps on facing forward, that is, the vehicle 1 travels parallel.

As shown in FIG. 11(b), when the joystick 64 is tilted leftward forward, the steering motors are driven and the wheels are steered leftward forward (toward the same direction as that the joystick 64 is tilted). In this state, by operating the accelerator pedal 63, the driving motors are driven, whereby the vehicle 1 travels leftward forward while the vehicle body 10 keeps on facing forward.

As mentioned above, in the special steering mode, the wheels of the vehicle 1 can be steered based on the tilting operation of the joystick 64. In the above explanation, only the cases in which the joystick 64 is tilted rightward forward and leftward forward are described. However, the tilting direction of the joystick 64 is not limited to the two directions. Namely, the joystick 64 can be tilted to an optional direction (for example, leftward forward or leftward), and the wheels are steered to the direction to which the joystick 64 is tilted. Therefore, by operating the accelerator pedal 63 while tilting the joystick 64 to a desired direction, the vehicle 1 can travel to the desired direction while the vehicle body 10 keeps on facing forward.

When the joystick 64 is tilted rightward rearward, leftward rearward or rearward, the steering motors are driven and the wheels are steered to the opposite direction to the direction to which the joystick 64 is tilted. In this state, when the accelerator pedal 63 is operated, the driving motors are driven to the direction opposite to that in the normal state (rearward). According to the construction, when the joystick 64 is tilted rearward, the vehicle 1 can travel to a desired direction while the vehicle body 10 keeps on facing forward.

Next, explanation will be given on the case of (2) rotating (twisting) the joystick 64 to an optional direction without tilting it while the lengthwise direction thereof is regarded as the axis.

As shown in FIG. 12(*a*), in the special steering mode, when the joystick 64 is rotated clockwise while not being tilted, the steering motors are driven and the wheels are steered so as to turn clockwise centering on a first turning center C. In more detail, the wheels are steered so as to be directed to the clockwise direction centering on the first turning center C on a tangent of a circle passing through the grounding points of the wheels centering on the first turning center C when viewed in plan. In this state, by operating the accelerator pedal 63, the driving motors are driven, whereby the vehicle 1 turns clockwise centering on the first turning center C. Namely, the vehicle 1 turns pivotally to the direction to which the joystick 64 is twisted.

As shown in FIG. 12(*b*), when the joystick 64 is rotated counterclockwise while not being tilted, the wheels are steered so as to turn counterclockwise centering on a first turning center C. In more detail, the wheels are steered so as to be directed to the counterclockwise direction centering on the first turning center C on a tangent of a circle passing through the grounding points of the wheels centering on the first turning center C when viewed in plan. In this state, by operating the accelerator pedal 63, the driving motors are driven, whereby the vehicle 1 turns counterclockwise centering on the first turning center C.

As mentioned above, in the special steering mode, the wheels of the vehicle 1 can be steered based on the rotating operation of the joystick 64. Namely, by operating the accelerator pedal 63 while rotating the joystick 64 to a desired direction, the vehicle 1 can turn to the desired direction centering on the first turning center C. The position of the first turning center C may be stored previously in the controller 100 or may alternatively be made controllable by a regulation means provided separately.

Next, explanation will be given on the case of (3) tilting the joystick 64 to an optional direction and simultaneously rotating the joystick 64 to an optional direction while the lengthwise direction thereof is regarded as the axis.

As shown in FIGS. 13(*a*) and 13(*b*), in the special steering mode, when the joystick 64 is rotated clockwise and tilted rightward, the wheels are steered so as to turn clockwise centering on a second turning center Cx.

When the joystick 64 is rotated clockwise and tilted rightward, the position of the second turning center Cx is determined based on the tilt direction and tilt angle of the joystick 64. In more detail, the second turning center Cx is determined as the position moving from the position of the predetermined first turning center C (see FIG. 12) to the direction to which the joystick 64 is tilted (rightward) for the distance corresponding to the amount of the tilt (tilt angle). Therefore, for example as shown in FIGS. 13(*a*) and 13(*b*), when the tilt angle of the joystick 64 is made large, the position of the second turning center Cx is moved rightward further.

Then, the wheels are steered so as to rotate clockwise centering on the second turning center Cx. In more detail, the wheels are steered so as to be directed to the clockwise direction centering on the second turning center Cx on a tangent of a circle passing through the grounding points of the wheels centering on the second turning center Cx when viewed in plan. In this state, by operating the accelerator pedal 63, the vehicle 1 can turn clockwise centering on the second turning center Cx.

As shown in FIGS. 14(*a*) and 14(*b*), when the joystick 64 is rotated counterclockwise and tilted leftward, the wheels are steered so as to turn counterclockwise centering on a second turning center Cx.

When the joystick 64 is rotated counterclockwise and tilted leftward, the position of the second turning center Cx is determined based on the tilt direction and tilt angle of the joystick 64. Namely, the second turning center Cx is determined as the position moving from the position of the predetermined first turning center C (see FIG. 12) to the direction to which the joystick 64 is tilted (leftward) for the distance corresponding to the amount of the tilt (tilt angle). Therefore, for example as shown in FIGS. 14(*a*) and 14(*b*), when the tilt angle of the joystick 64 is made large, the position of the second turning center Cx is moved leftward further.

Then, the wheels are steered so as to rotate counterclockwise centering on the second turning center Cx. In more detail, the wheels are steered so as to be directed to the counterclockwise direction centering on the second turning center Cx on a tangent of a circle passing through the grounding points of the wheels centering on the second turning center Cx when viewed in plan. In this state, by operating the accelerator pedal 63, the vehicle 1 can turn counterclockwise centering on the second turning center Cx.

As mentioned above, in the special steering mode, the wheels of the vehicle 1 can be steered based on the rotating and tilting operations of the joystick 64. Namely, the position of the second turning center Cx is determined based on the tilting operation of the joystick 64, and the turning direction is determined based on the rotating operation of the joystick 64. By operating the accelerator pedal 63 simultaneously with these operations, the vehicle 1 can turn to a desirable direction centering on the second turning center Cx.

In the above explanation, only the case in which the joystick 64 is rotated clockwise and tilted rightward and the case in which the joystick 64 is rotated counterclockwise and tilted and leftward forward are described. However, the operation of the joystick 64 is not limited to these operations. Namely, the joystick 64 can be rotated to an optional direction (clockwise or counterclockwise) and can be tilted simultaneously to an optional direction (for example, rightward forward, leftward forward or the like). Therefore, by operating the accelerator pedal 63 while the joystick 64 is rotated to an optional direction and tilted to an optional direction, the vehicle 1 can turn to a desired direction centering on the second turning center Cx determined at a desired position.

As mentioned above, the vehicle 1 in this embodiment includes the wheels including the two front wheels (the left front wheel 21 and the right front wheel 31) and the two rear wheels (the left rear wheel 41 and the right rear wheel 51), the steering actuators (the left front wheel steering motor 23, the right front wheel steering motor 33, the left rear wheel steering motor 43 and the right rear wheel steering motor 53) connected respectively to the wheels so as to steer the wheels, the driving actuators (the left front wheel driving motor 22, the right front wheel driving motor 32, the left rear wheel driving motor 42 and the right rear wheel driving motor 52) respectively connected to the wheels so as to drive the wheels, the joystick 64 which can be operated by being tilted to an optional direction so as to command the action of the steering actuators, the accelerator pedal 63 commanding the action of the driving actuators, and the controller 100 which steers the wheels to the direction to which the joystick 64 is tilted when the joystick 64 is tilted, and drives the wheels based on the operation amount of the accelerator pedal 63 when the accelerator pedal 63 is operated.

According to the construction, only by tilting the joystick 64 to a desired direction, the plurality of the wheels can be steered to the direction. In this state, by operating the accelerator pedal 63, the vehicle 1 can travel to the direction. Therefore, the vehicle 1 can move parallel to an optional direction easily by easy operation.

The joystick 64 according to this embodiment can be operated by being twisted to an optional direction, and when the joystick 64 is twisted while not being tilted, the controller 100 steers the wheels so as to turn to the direction to which the joystick 64 is twisted centering on the predetermined first turning center C.

According to the construction, only by twisting the joystick 64 to a desired direction, the wheels can be steered so as to turn to the direction to which the joystick 64 is twisted centering on the predetermined first turning center C. In this state, by operating the accelerator pedal 63, the vehicle 1 can turn to the direction. Therefore, the vehicle 1 can turn centering on the predetermined first turning center C easily by easy operation. The state of operation of the joystick 64 is similar to the state of turning of the vehicle 1, whereby an operator can estimate the state of turning of the vehicle 1 easily. Therefore, the operator can operate the vehicle 1 sensibly, whereby the operability is improved.

When the joystick 64 is tilted while being, twisted, the controller 100 according to this embodiment determines the second turning center Cx based on the tilt direction and tilt angle of the joystick 64, and steers the wheels so as to turn to the direction to which the joystick 64 is twisted centering on the second turning center Cx.

According to the construction, only by tilting the joystick 64 to a desired direction while twisting the joystick 64, the second turning center Cx can be controlled optionally and the wheels can be steered so as to turn to the direction to which the joystick 64 is twisted centering on the second turning center Cx. In this state, by operating the accelerator pedal 63, the vehicle 1 can turn to the direction. Therefore, the vehicle 1 can turn centering on the second turning center Cx easily by easy operation. The state of operation of the joystick 64 is similar to the state of turning of the vehicle 1, whereby an operator can estimate the state of turning of the vehicle 1 easily. Therefore, the operator can operate the vehicle 1 sensibly, whereby the operability is improved.

The vehicle 1 according to this embodiment can turn with the steering wheel 62 in the normal steering mode. Therefore, in the case in which parallel movement or minimum turning is not required, the vehicle 1 can be operated with the operation sense similar to that of a general motorcar. Furthermore, the vehicle 1 has only two modes, i.e., the normal steering mode and the special steering mode, and these modes can be switched only by operating the selector switch 65. Therefore, it is not necessary to switch many modes and an operator can select the operating method of the vehicle 1 easily and can select one of the modes easily by easy operation.

In this embodiment, the control concerning the steering of the wheels is mainly described. The rotational speeds of the wheels can also be controlled simultaneously. For example, when the vehicle 1 turns, the driving wheels can be prevented from slipping about the ground surface by controlling the rotational speeds of the wheels. According to the control, the abrasion of the wheels can be prevented, and braking power caused by friction between the wheels and the ground surface can be prevented from being applied on the vehicle 1.

Explanation will be given on an art for improving feedback control performance of a controlled object including a dead time.

Conventionally, in the case in which feedback control of a control amount y is performed by a PID controller 262 to a controlled object 261 including a dead time as shown in FIG. 29($a$), when a control gain of the PID controller 262 (feedback gain) is large, the system is unstable because of overshoot of the control amount y about a target value y* and hunting caused by influence of the dead time (see FIG. 29($b$)). On the other hand, when the control gain of the PID controller 262 is small, the time until the control amount y reaches the target value y* is large, whereby the PID control cannot be employed for the purpose in which quick response is required (see FIG. 29($c$)).

As shown in FIG. 30($a$), an art is well known in which the dead time included in such a controlled object 261 is compensated by a compensator 263 of the dead time of smith. By exchanging a block drawing to which the compensator 263 of the dead time of smith is added, a block drawing shown in FIG. 30($b$) is obtained.

According to this art, a transfer function $e^{-Ls}$ of the dead time can be pushed out from a feedback loop 264. Then, an actual model 265 of the controlled object 261 from which the dead time is removed is only included in the feedback loop 264. Therefore, in comparison with the case in which the feedback loop 264 includes the dead time, the control gain of the PID controller 262 (feedback gain) can be set larger, whereby the responsibility of the control amount y can be improved while keeping the system stable.

However, in the art in which the dead time is compensated by the compensator 263 of the dead time of smith, the dead time of the controlled object 261 is included in a control parameter of a feedback control device 266 (the compensator 263 of the dead time of smith). Accordingly, when the dead time of the controlled object 261 is changed by aged variation or the like or when an error is generated in the modeling of the dead time (an error is generated in a constant L), the compensator 263 of the dead time of smith does not function enough, whereby the control amount y diverges and the control becomes unstable (see FIG. 30($c$)).

The same may be said of the actual model 265 of the controlled object 261 from which the dead time is removed. Since the actual model 265 of the controlled object 261 is included in the control parameter of a feedback control device 266 (the compensator 263 of the dead time of smith), when the actual model 265 of the controlled object 261 is changed by aged variation or the like or when an error is generated in the modeling of the actual model 265, the compensator 263 of the dead time of smith does not function enough, whereby the control becomes unstable.

In consideration of the above problems, we provides a feedback control device and a feedback control method which can control stably a controlled object including a dead time and improve responsibility of a control amount.

The feedback control device of a controlled object including a dead time includes a detection means detecting a control amount of the controlled object, a first output value calculation means which inputs the control amount into an inverse model of a transfer function of the controlled object from which the dead time is removed so as to obtain a first output value, a second output value calculation means which subtracts the first output value from the operation amount of the controlled object so as to obtain a second output value, a third output value calculation means which inputs the second output value into the transfer function of the controlled object from which the dead time is removed so as to obtain a third output value, a deviation calculation means which subtracts the control amount from a target value of the control amount so as to obtain a deviation, a deviation revision means which subtracts the third output value from the deviation so as to obtain a revised deviation, and an operation amount calculation means which inputs the revised deviation so as to obtain the operation amount of the controlled object.

According to the construction, in the feedback control of the controlled object including the dead time, the dead time of the controlled object can be compensated and pushed out from a feedback loop. Therefore, even if the control gain is large, the control is stable. Accordingly, the control gain can be set large so as to improve the responsibility of the control amount. Since the dead time of the controlled object is not included in the control parameter of the compensator, the dead time can be compensated even if the dead time is changed by aged variation or the like or an error is generated in the modeling of the dead time, whereby the control can be performed stably.

The feedback control device of a controlled object including a dead time includes a detection means detecting a control amount of the controlled object, a first output value calculation means which inputs the control amount into an inverse model of a transfer function of the controlled object from which the dead time is removed so as to obtain a first output value, a second output value calculation means which subtracts the first output value from an operation amount of the controlled object so as to obtain a second output value, a third output value calculation means which inputs the second output value into the transfer function of the controlled object from which the dead time is removed so as to obtain a third output value, a fourth output value calculation means which inputs the third output value into a filter through which only a specific frequency component can pass so as to obtain a fourth output value, a deviation calculation means which subtracts the control amount from a target value of the control amount so as to obtain a deviation, a deviation revision means which subtracts the fourth output value from the deviation so as to obtain a revised deviation, and an operation amount calculation means which inputs the revised deviation so as to obtain the operation amount of the controlled object.

According to the construction, in the feedback control of the controlled object including the dead time, the dead time of the controlled object can be compensated and pushed out from a feedback loop. Therefore, even if the control gain is large, the control is stable. Accordingly, the control gain can be set large so as to improve the responsibility of the control amount. Since the dead time of the controlled object is not included in the control parameter of the compensator, the dead time can be compensated even if the dead time is changed by aged variation or the like or an error is generated in the modeling of the dead time, whereby the control can be performed stably. When the actual model of the controlled object is changed by aged variation or the like or when an error is generated in the modeling of the controlled object, any offset is not generated between the target value and the control amount.

A fifth output value calculation means which multiplies the deviation and a predetermined proportional gain or integrates the deviation for a predetermined time so as to obtain a fifth output value, and an operation amount revision means which adds the fifth output value to the operation amount so as to obtain a revised operation amount.

According to the construction, when the actual model of the controlled object is changed by aged variation or the like or when an error is generated in the modeling of the controlled object, any offset is not generated between the target value and the control amount.

The control amount of the controlled object including the dead time is inputted into the inverse model of the transfer function of the controlled object from which the dead time is removed so as to obtain the first output value, the first output value is subtracted from the operation amount of the controlled object so as to obtain the second output value, the second output value is inputted into the transfer function of the controlled object from which the dead time is removed so as to obtain the third output value, the third output value is subtracted from the deviation so as to obtain the revised deviation, and the feedback control is performed based on the revised deviation.

According to the construction, in the feedback control of the controlled object including the dead time, the dead time of the controlled object can be compensated and pushed out from a feedback loop. Therefore, even if the control gain is large, the control is stable. Accordingly, the control gain can be set large so as to improve the responsibility of the control amount. Since the dead time of the controlled object is not included in the control parameter of the compensator, the dead time can be compensated even if the dead time is changed by aged variation or the like or an error is generated in the modeling of the dead time, whereby the control can be performed stably.

The control amount of the controlled object including the dead time is inputted into the inverse model of the transfer function of the controlled object from which the dead time is removed so as to obtain the first output value, the first output value is subtracted from the operation amount of the controlled object so as to obtain the second output value, the second output value is inputted into the transfer function of the controlled object from which the dead time is removed so as to obtain the third output value, the third output value is inputted into the filter through which only the specific frequency component can pass so as to obtain the fourth output value, the fourth output value is subtracted from the deviation so as to obtain the revised deviation, and the feedback control is performed based on the revised deviation.

According to the construction, in the feedback control of the controlled object including the dead time, the dead time of the controlled object can be compensated and pushed out from a feedback loop. Therefore, even if the control gain is large, the control is stable. Accordingly, the control gain can be set large so as to improve the responsibility of the control amount. Since the dead time of the controlled object is not included in the control parameter of the compensator, the dead time can be compensated even if the dead time is changed by aged variation or the like or an error is generated in the modeling of the dead time, whereby the control can be performed stably. When the actual model of the controlled object is changed by aged variation or the like or when an error is generated in the modeling of the controlled object, any offset is not generated between the target value and the control amount.

Next, explanation will be given on a feedback control device 201 according to an embodiment.

Figure 15:
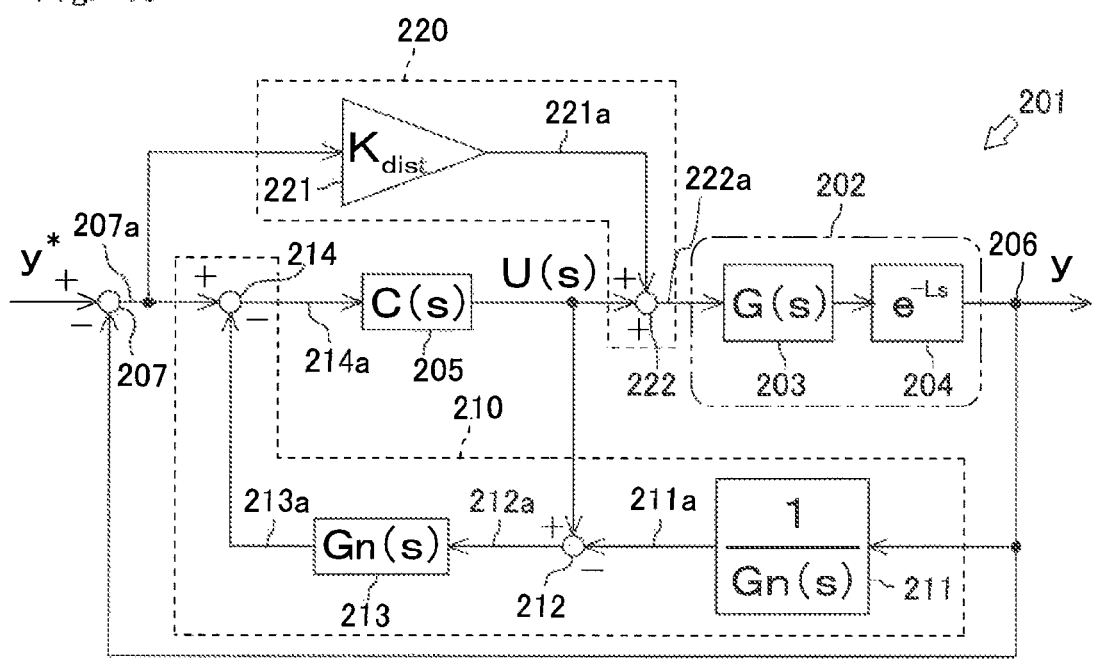
[FIG. 15] It is a block drawing of a feedback control device according to an embodiment of the present invention.

As shown in FIG. 15, the feedback control device 201 includes a controlled object 202, a PID controller 205, a detection means 206 of a control amount y, a deviation calculation means 207, a command means (not shown) of a target value y* of the control amount y, a dead time compensator 210, and a revision means 220.

The controlled object 202 includes an actuator or the like. A transfer function of the controlled object 202 is explained as $G(s) \cdot e^{-Ls}$ including the dead time. The transfer function as $G(s) \cdot e^{-Ls}$ is explained as an actual model 203, and the transfer function $e^{-Ls}$ is explained as a dead time 204. The actual model 203 includes a first-order lag system, a second-order lag system and the like. The dead time 204 is a model which responds L seconds after inputting an unit step, for example. s is a Laplacian.

The PID controller 205 is an operation amount calculation means which calculates an operation amount U(s) of the controlled object 202. A revised deviation 214a discussed later is inputted into the PID controller 205. In the PID controller 205, a value proportional to the revised deviation 214a (P action), a value obtained by integrating the revised deviation 214a (I action), and a value obtained by differentiate temporally the revised deviation 214a (D action) are added, and the operation amount U(s) is obtained as the calculation value. The operation amount U(s) is inputted into a second output value calculation means 212 of the dead time compensator 210 and an operation amount revision means 222 of the revision means 220. The PID controller 205 is explained by a transfer function C(s). The control gain (proportional gain), integral gain (integral time) and differential gain (differential time) of the PID controller 205 are suitable controlled as control parameters corresponding to a transfer function as G(s) of the controlled object 202, that is, the actual model 203.

The detection means 206 detects the control amount y which is an output value of the controlled object 202. The control amount y which is an output value of the controlled object 202 is inputted into the deviation calculation means 207 and a first output value calculation means 211 of the dead time compensator 210.

In the deviation calculation means 207, the control amount y is subtracted from the target value y* so as to obtain a deviation 207a. The deviation 207a is inputted into a deviation revision means 214 of the dead time compensator 210 and a fifth output value calculation means 221 of the revision means 220.

The dead time compensator 210 includes the first output value calculation means 211, the second output value calculation means 212, a third output value calculation means 213 and the deviation revision means 214.

The first output value calculation means 211 is an inverse number (inverse model) of the actual model 203 and explained as a transfer function 1/Gn(s), and details thereof will be described later. In the first output value calculation means 211, the control amount y is inputted into the inverse model 1/Gn(s) of the transfer function of the controlled object 202 from which the dead time 204 is removed so as to obtain a first output value 211a. The first output value 211a is inputted into the second output value calculation means 212.

In the second output value calculation means 212, the first output value 211a of the first output value calculation means 211 is subtracted from the operation amount U(s) outputted from the PID controller 205 so as to obtain a second output value 212a. The second output value 212a is inputted into the third output value calculation means 213.

The third output value calculation means 213 is the actual model 203 and explained as a transfer function Gn(s), and details thereof will be described later. In the third output value calculation means 213, the second output value 212a is inputted into the transfer function Gn(s) of the transfer function of the controlled object 202 from which the dead time 204 is removed so as to obtain a third output value 213a. The third output value 213a is inputted into the deviation revision means 214.

In the deviation revision means 214, the third output value 213a is subtracted from the deviation 207a so as to obtain the revised deviation 214a. The revised deviation 214a is inputted into the PID controller 205.

The revision means 220 includes the fifth output value calculation means 221 and the operation amount revision means 222.

The fifth output value calculation means 221 includes a proportional element which outputs a value proportional to the input value. The control gain (proportional gain) is $K_{dist}$. In the fifth output value calculation means 221, $K_{dist}$ is multiplied with the deviation 207a so as to obtain a fifth output value 221a. The fifth output value 221a is inputted into the operation amount revision means 222.

In the operation amount revision means 222, the fifth output value 221a is added to the operation amount U(s) outputted from the PID controller 205 so as to obtain a revised operation amount 222a. The revised operation amount 222a is inputted into the controlled object 202.

Figure 16:
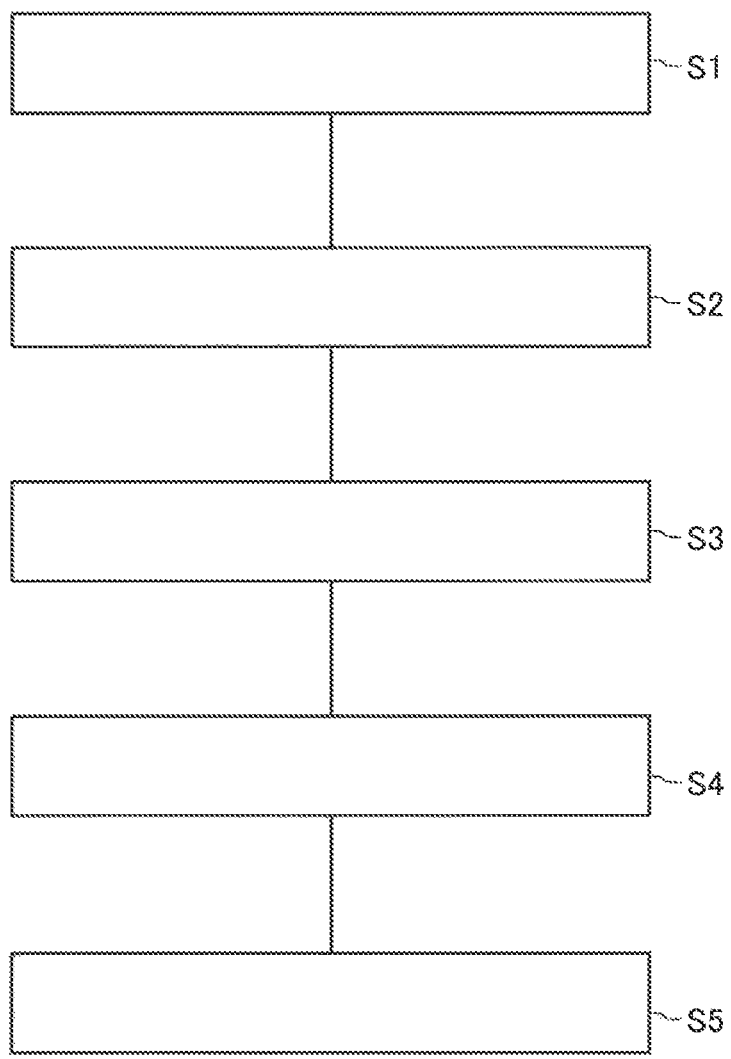
[FIG. 16] It is a flow chart of a feedback control method according to an embodiment of the present invention.

According to the construction, the feedback control device 201 performs the feedback control with a below method. As shown in FIG. 16, in the feedback control device 201, the control amount y of the controlled object 202 including the dead time is inputted into the inverse model 1/Gn(s) of the transfer function of the controlled object from which the dead time 204 is removed so as to calculates the first output value 211a (S1). The first output value 211a is subtracted from the operation amount U(s) of the controlled object 202 so as to calculates the second output value 212a (S2). The second output value 212a is inputted into the transfer function Gn(s) of the transfer function of the controlled object 202 from which the dead time 204 is removed so as to calculate the third output value 213a (S3). The third output value 213a is subtracted from the deviation so as to calculate the revised deviation 214a (S4). Then, the feedback control device 201 performs the feedback control based on the revised deviation 214a (S5).

The feedback control device 201 may alternatively be constructed as shown in FIG. 17(a).

The dead time compensator 210 of the feedback control device 201 is constructed the same as the above embodiment, and the fifth output value calculation means 221 of the operation amount revision means 222 is an integral controller. The control gain of the integral controller (integral gain) is $I_{dist}$. The deviation 207a is integrated for a time corresponding to $I_{dist}$ so as to obtain the fifth output value 221a. The fifth output value 221a is inputted into the operation amount revision means 222.

The feedback control device 201 may alternatively be constructed as shown in FIG. 17(b).

The feedback control device 201 includes a fourth output value calculation means 215 instead of the revision means 220.

The fourth output value calculation means 215 is a filter through which only a specific frequency component can pass, minutely a high-pass filter through which only a frequency component not less than a set frequency can pass, and explained as a transfer function F(s). In the fourth output value calculation means 215, the third output value 213a outputted from the third output value calculation means 213 is inputted into the transfer function F(s) so as to obtain a fourth output value 215a. The fourth output value 215a is inputted into the deviation revision means 214.

In the deviation revision means 214, the fourth output value 215a is subtracted from the deviation 207a so as to obtain the revised deviation 214a. The revised deviation 214a is inputted into the PID controller 205.

In the PID controller 205, the operation amount U(s) is obtained from the revised deviation 214a. The operation amount U(s) is inputted into the controlled object 202 and the second output value calculation means 212 of the dead time compensator 210.

Figure 18:
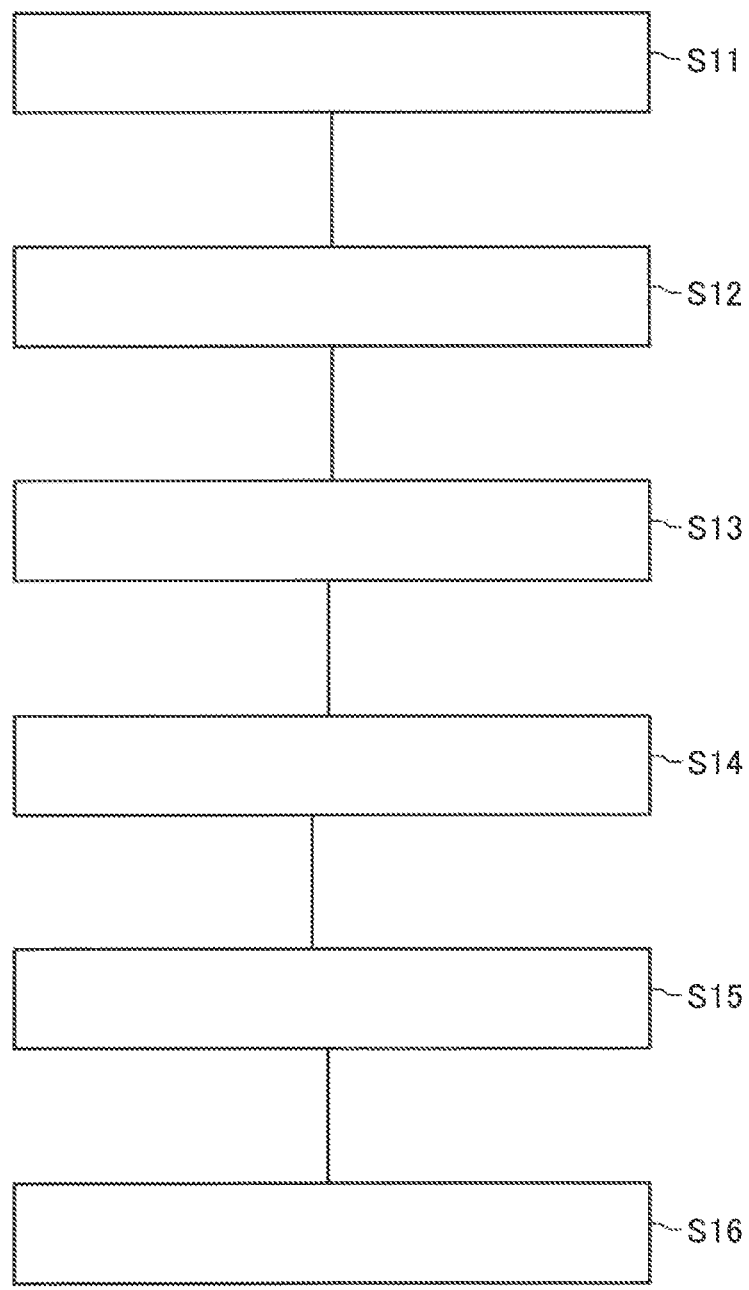
[FIG. 18] It is a flow chart of a feedback control method according to another embodiment of the present invention.

According to the construction, the feedback control device 201 performs the feedback control with a below method. As shown in FIG. 18, in the feedback control device 201, the control amount y of the controlled object 202 including the dead time 204 is inputted into the inverse model 1/Gn(s) of the transfer function of the controlled object 202 from which the dead time 204 is removed so as to calculates the first output value 211a (S11). The first output value 211a is subtracted from the operation amount U(s) of the controlled object 202 so as to calculates the second output value 212a (S12). The second output value 212a is inputted into the transfer function Gn(s) of the controlled object 202 from which the dead time 204 is removed so as to calculate the third output value 213a (S13). The third output value 213a is inputted into the transfer function F(s) so as to calculate the fourth output value 215a (S14). The fourth output value 215a is subtracted from the deviation 207a so as to calculate the revised deviation 214a (S15). Then, the feedback control device 201 performs the feedback control based on the revised deviation 214a (S16).

Next, explanation will be given on the basis of the construction of the dead time compensator 210 and the revision means 220 referring to FIGS. 19 to 23.

In the compensator 263 of the dead time of smith (FIG. 29), the dead time is employed as a control parameter (in detail, the constant L). Therefore, when an error exists between the constant L of the dead time of the controlled object 261 and a constant Ln of a dead time estimate by the modeling of the controlled object 261, the control is unstable. Then, the dead time of the controlled object 261 is regarded as a disturbance and the disturbance is compensated by a disturbance observer, whereby the dead time of the controlled object 261 is compensated.

In FIG. 19(a), the feedback control is performed with the PID controller 262 while the actual model 265 of the controlled object 261 including the transfer function e$^{-Ls}$ of the dead time is regarded as the transfer function G(s). By converting equivalently FIG. 19(a) while the transfer function e$^{-Ls}$ of the dead time of the controlled object 261 is regarded as a disturbance d, FIG. 19(b) is obtained. A signal of the disturbance d is expressed by below Formula 15.

$$d = U(s) - U(s)e^{-Ls} \quad \text{[Formula 15]}$$

Next, the disturbance d is estimated by the disturbance observer so as to compensate the disturbance d.

As shown in FIG. 20(a), an inverse model of the actual model 265 of the controlled object 261 not including the transfer function e$^{-Ls}$ (referred to as inverse model estimate 267) is formed, and the control amount y is inputted into the inverse model estimate 267. In this case, the inverse model estimate 267 is expressed by the inverse model 1/Gn(s). The control amount y is expressed by below Formula 16.

$$y = U(s)G(s)e^{-Ls} \quad \text{[Formula 16]}$$

The control amount y is inputted from the operation amount U(s) which is the output of the PID controller 262 into the inverse model estimate 267, and the value from which the output (calculation value) is subtracted is expressed by below Formula 17.

$$U(s) - y \times \frac{1}{Gn(s)} = U(s) - U(s)G(s)e^{-Ls} \times \frac{1}{Gn(s)} \quad \text{[Formula 17]}$$

In this case, when G(s) is equal to Gn(s) and any error exists in the model, Formula 17 is expressed by below Formula 18.

$$U(s) - y \times \frac{1}{Gn(s)} = U(s) - U(s)e^{-Ls} \quad \text{[Formula 18]}$$

Namely, Formula 18 is equal to Formula 15. Therefore, by finding the calculation value of Formula 18, the estimate of the disturbance d can be found.

Next, as shown in FIG. 20(b), the model of the controlled object 261 not including the transfer function e$^{-Ls}$ (referred to as actual model estimate 268) is formed, and the estimated disturbance d is inputted into the actual model estimate 268. In this case, the actual model estimate 268 is expressed by the transfer function Gn(s). When the control amount y is added to the output of the actual model estimate 268, the calculation value is expressed by below Formula 19.

$$d \times Gn(s) + y = (U(s) - U(s)e^{-Ls}) \times Gn(s) + y \quad \text{[Formula 19]}$$
$$= U(s)Gn(s) - U(s)e^{-Ls}Gn(s) +$$
$$U(s)G(s)e^{-Ls}$$

In this case, when G(s) is equal to Gn(s) and any error exists in the model, Formula 19 is expressed by below Formula 20.

$$d \times Gn(s) + y = U(s)G(s) \quad \text{[Formula 20]} = U(s)G(s)$$

The calculation value of Formula 20 (feedback value 269) is an output in the case in which the operation amount U(s) is inputted into the transfer function G(s) of the controlled object 261 from which the transfer function e$^{-Ls}$ is removed, that is, the actual model 265, and means the control amount y from which the influence of the dead time is removed. In other words, the dead time can be pushed out from the feedback loop (feedback value 269) without employing the dead time as the control parameter by the disturbance observer. Accordingly, the control gain (feedback gain) of the PID controller 262 can be set large regardless of the dead time, whereby the responsibility of the control is improved.

When the dead time of the controlled object is changed and the error of the estimated dead time is increased (the error increases from L1 to L4), the compensation of the dead time of smith causes the divergence of the control amount y and the system is unstable (see FIG. 21(a)). However, the compensation of the dead time by the disturbance observer detects the influence of the dead time as the disturbance so as to deal with all dead times, whereby the control amount y does not diverge and the system is not unstable (see FIG. 21(b)).

Accordingly, in the compensation of the dead time with the feedback control, instead of removing the dead time, the dead time is pushed out from the feedback loop so as to increase the control gain, thereby improving the controllability.

Next, the influence of error of the model is examined. As mentioned above, the compensation of the dead time by the disturbance observer employs the actual model 265 not including the transfer function $e^{-Ls}$ of the dead time of the controlled object 261, that is, G(s) as a control parameter. When an error exists in the model, that is, when the relation G(s)≠Gn(s) is valid, Formula 20 is expressed by below Formula 21.

$$d \times Gn(s) + y = U(s)Gn(s) \quad \text{[Formula 21]}$$

Namely, the above control is equal to feed forward control based on the actual model 265 of the controlled object, and an offset for the error of the model is generated in the control amount y.

By adding elements compensating the influence of the error of the model to FIG. 20(b), FIG. 22(a) is obtained. Namely, the compensation element by the disturbance observer is subtracted after finding the deviation between the target value y* and the control amount y so as to find the influence of the error of the model as the deviation. The product of the deviation and a control gain $K_{dist}$ in a proportional controller 270 is added as the compensation element of the error of the model to the operation amount U(s) which is the output of the PID controller 262 (the revision means 220). According to the construction, the offset of the control amount y by the error of the model can be suppressed.

The proportional controller 270 may be an integral controller or a PI controller (proportional integral controller) corresponding to the characteristics of the controlled object.

It may alternatively be constructed as FIG. 22(b) so as to add the element for compensating the influence of the error of the model. Namely, the output value of the actual model estimate 268 is inputted into a high-pass filter 271 through which only a specific frequency component, i.e. a frequency component not less than a set frequency can pass, and then the deviation is subtracted. Accordingly, the compensation of the dead time is valid only in the high frequency area which is unstable by the effect of the dead time and the compensation element is invalid in the other frequency area, whereby the offset of the control amount y caused by the error of the model can be suppressed.

Figure 23:
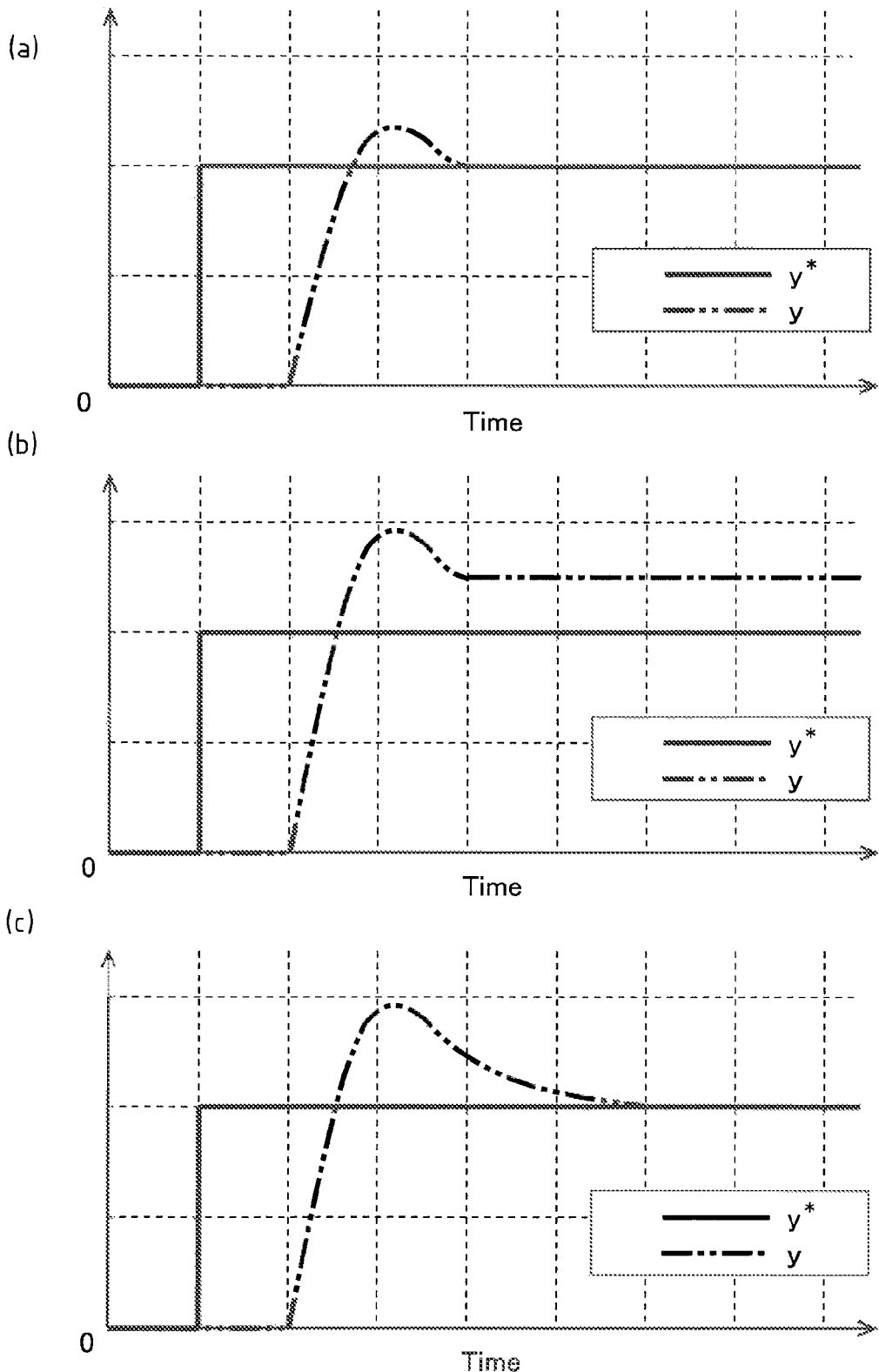
[FIG. 23] (a) is a graph of offset in the case in which the error of the model does not exist, (b) is a graph of the offset in the case in which the error of the model is 50%, and (c) is a graph of the offset in the case in which the error of the model is 50% and the compensation exists.

FIG. 23 is a graph showing the influence of the error of the model. FIG. 23(a) shows the case in which the relation G(s)= Gn(s) is valid and any error exists in the model. According to the diagram, the offset which is the stationary deviation between the target value y* and the control amount y is not generated=and the control amount y converges on the target value y*. FIG. 23(b) shows the case in which the relation G(s)≠Gn(s) is valid and the error of the model is about 50%. According to the diagram, the offset is generated. FIG. 23(b) shows the case in which the element compensating the influence of the error of the model is added when the relation G(s)≠Gn(s) is valid and the error of the model is about 50%. According to the diagram, the offset is not generated and the control amount y converges on the target value y*.

Next, explanation will be given on the case in which a feedback control device 240 similar to the embodiment mentioned above is employed in control of an angle of a swash plate of a HST (Hydro Static Transmission) in a working vehicle 300.

Figure 24:
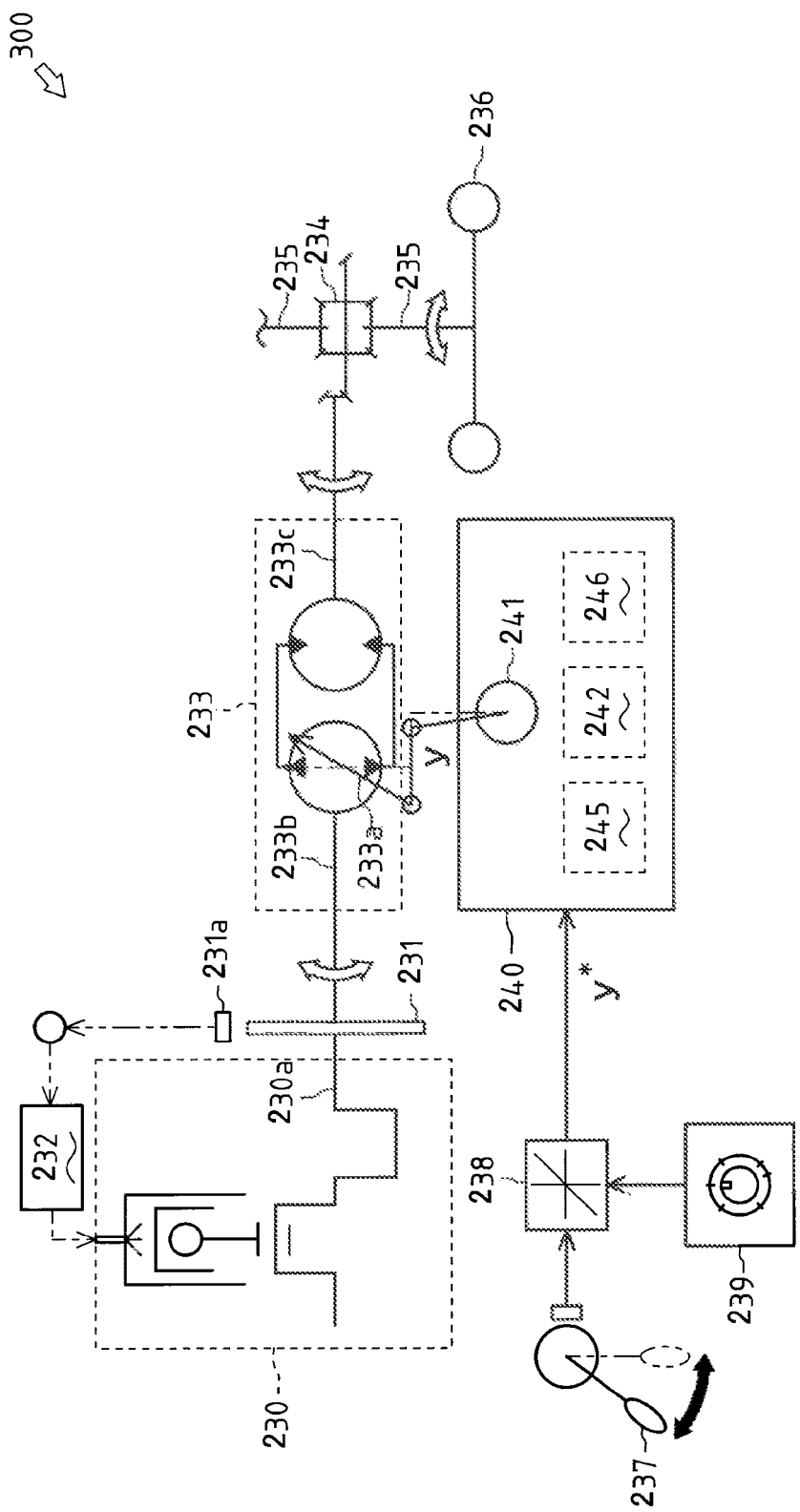
[FIG. 24] It is an entire system chart of the case in which the feedback control device is applied to swash plate control of a HST.

Firstly, explanation will be given on the entire construction of the working vehicle 300 referring to FIG. 24. The working vehicle 300 includes an engine 230, a flywheel 231, an engine control device 232, a HST 233, a differential 234, wheels 236, a speed change lever 237, a rate-of-change limiting means 238, a μ setting dial 239, and the feedback control device 240.

The engine 230 generates rotational power for driving the working vehicle 300. A crankshaft 230a of the engine 230 is interloockingly connected to the flywheel 23 L The rotational power of the engine 230 is transmitted through the crankshaft 230a to the flywheel 231.

The flywheel 231 stores inertia force so as to rotate the engine 230 smoothly. The flywheel 231 is rotated by the rotational power transmitted through the crankshaft 230a. The rotational speed of the flywheel 231 is detected by a rotational speed sensor 231a such as a magnetic pickup type sensor or a rotary encoder.

The engine control device 232 controls the rotational speed of the engine 230. The engine control device 232 is connected to the rotational speed sensor 231a. The engine control device 232 controls the rotational speed of the engine 230 based on the rotational speed of the flywheel 231 detected by the rotational speed sensor 231a.

The HST 233 drives a variable capacity type hydraulic pump by the engine 230 and exchanges generated hydraulic pressure into rotational power by a fixed capacity type hydraulic motor. The HST 233 changes discharge amount and discharge direction of hydraulic oil of the hydraulic pump corresponding to an angle of a movable swash plate 233a provided in the hydraulic pump so as to control the rotational speed and rotational direction of the hydraulic motor. Accordingly, the rotational power of the engine 230 inputted through an input shaft 233b of the hydraulic pump is changed steplessly in speed and outputted to an output shaft 233c of the hydraulic motor. One of the ends of the input shaft 233b of the hydraulic pump is interloockingly connected to the flywheel 231, whereby the rotational power of the engine 230 is transmitted to the HST 233.

The differential 234 divides the rotational power. One of the ends of the output shaft 233c of the hydraulic motor is interloockingly connected to the differential 234, and the rotational power of the engine 230 changed in speed by the HST 233 is transmitted to the differential 234. The transmitted rotational power is divided into the left and right sides by the differential 234.

Ones of ends of axles 235 are interloockingly connected respectively to the left and right sides of the differential 234. The axles 235 transmits the rotational power divided by the differential 234.

The other ends of the axles 235 are interloockingly connected to the wheels 236, and the wheels 236 are rotated by the rotational power transmitted through the axles 235.

The speed change lever 237 sets (St) a wheel speed (rotational speed of the wheels 236) S. An operator operates the speed change lever 237 so as to control the wheel speed S.

The rate-of-change limiting means 238 limits the target value y* of the movable swash plate 233a to a predetermined change rate. A limit value B of the change rate is determined corresponding to the value of μ (coefficient of friction) set by the μ setting dial 239. The value of μ is changed suitably corresponding to the state of grounding surface of the wheels 236.

The change rate of the target value y* of the movable swash plate 233a is compared with the limit value B of the change rate set by the μ setting dial 239 so as to determine the target value y* of the movable swash plate 233a. The rate-of-change limiting means 238 outputs the target value y*.

As discussed later, the feedback control device 240 includes an actuator 241, a PID controller 242, a dead time compensator 245 and a revision means 246. The movable swash plate 233a of the HST 233 is interloockingly connected to a rotational shaft of the actuator 241. The target angle of the rotational shaft of the actuator 241 (the target value y*) is inputted into the feedback control device 240, and the angle of the rotational shaft of the actuator 241 (the control amount y) is outputted.

In this construction, when an operator operates the speed change lever 237 and the μ setting dial 239, the target value y* of the actuator 241 is outputted from the rate-of-change limiting means 238 to the feedback control device 240. Based on the control amount y of the actuator 241 outputted from the feedback control device 240, the angle of the movable swash plate 233a of the hydraulic pump of the HST 233 is changed so that the discharge amount and discharge direction of hydraulic oil of the hydraulic pump is changed, whereby the rotational power transmitted from the engine 230 through the flywheel 231 is changed in speed. The rotational power changed in speed is transmitted through the differential 234 and the axles 235 to the wheels 236.

In this embodiment, in the control of the wheel speed S, open control is employed on and after the feedback control device 240, and the wheel speed S is determined according to the angle of the movable swash plate corresponding to the control amount y. However, the present invention is not limited thereto. For example, it may alternatively be constructed that a rotational speed sensor is provided on the output shaft 233c and the rotational speed of the wheels 236 is fed back so as to control the wheel speed S.

Figure 25:
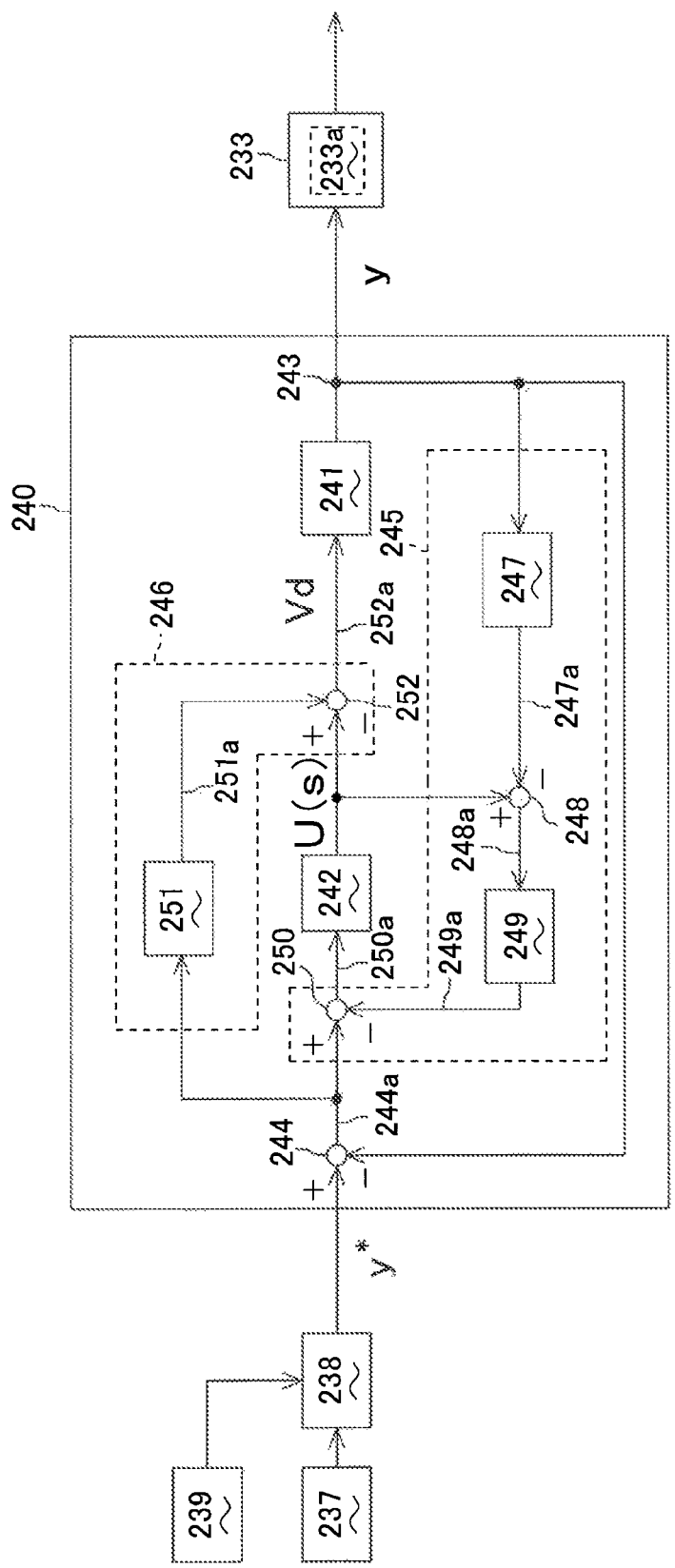
[FIG. 25] It is a block drawing of the feedback control device.

Next, explanation will be given on the construction of the feedback control device 240 referring to FIG. 25.

The feedback control device 240 includes the actuator 241 which is a controlled object, the PID controller 242, an angle sensor 243 which is a detection means of the control amount y, a deviation calculation means 244, the dead time compensator 245 of the disturbance observer, and the revision means 246. As mentioned above, the target angle of the rotational shaft of the actuator 241 (the target value y*) is inputted into the feedback control device 240, and the angle of the rotational shaft of the actuator 241 (the control amount y) is outputted.

The actuator 241 changes the slant angle of the movable swash plate 233a of the HST 233. The actuator 241 includes a servomotor or the like. The transfer function of the actuator 241 is explained as $G(s)e^{-Ls}$ including the dead time.

The PID controller 242 is an operation amount calculation means calculating the operation amount U(s) of the actuator 241. A revised deviation 250a discussed later is inputted into the PID controller 242. In the PID controller 242, a value proportional to the deviation 250a (P action), a value obtained by integrating the deviation 250a (I action), and a value obtained by differentiate temporally the deviation 250a (D action) are added, and the operation amount U(s) is obtained as the calculation value. The operation amount U(s) is inputted into a second output value calculation means 248 of the dead time compensator 245 and an operation amount revision means 252 of the revision means 246. The PID controller 242 is explained by a transfer function C(s). The control gain (proportional gain), integral gain (integral time) and differential gain (differential time) of the PID controller 242 are suitable controlled as control parameters corresponding to a transfer function as G(s) of the actuator 241.

The angle sensor 243 includes a rotary encoder, a Hall sensor and the like. The angle sensor 243 detects the control amount y of the actuator 241. The control amount y is inputted into the deviation calculation means 244 and a first output value calculation means 247 of the dead time compensator 245 of the disturbance observer.

The angle sensor 243 may be constructed integrally with the actuator 241.

In the deviation calculation means 244, the control amount y detected by the angle sensor 243 is subtracted from the target value y* of the angle of the rotational shaft of the actuator 241 commanded by the rate-of-change limiting means 238, whereby a deviation 244a is obtained. The deviation 244a is inputted into a deviation revision means 250 of the dead time compensator 245 of the disturbance observer and a fifth output value calculation means 251 of the revision means 246.

The dead time compensator 245 includes a first output value calculation means 247, the second output value calculation means 248, a third output value calculation means 249 and the deviation revision means 250.

first output value calculation means 247 is an inverse of the estimated transfer function of the actuator 241 from which the dead time is removed (inverse model estimate) and expressed as the transfer function 1/Gn(s). In the first output value calculation means 247, the control amount y detected by the angle sensor 243 is inputted into the inverse model 1/Gn(s) of the transfer function of the actuator 241 from which the dead time is removed, whereby a first output value 247a is obtained. The first output value 247a is inputted into the second output value calculation means 248.

In the second output value calculation means 248, the first output value 247a of the first output value calculation means 247 is subtracted from the operation amount U(s) outputted from the PID controller 242, whereby a second output value 248a is obtained. The second output value 248a is inputted into the third output value calculation means 249.

The third output value calculation means 249 is expressed as the estimated transfer function Gn(s) of the actuator 241 from which the dead time is removed. In the third output value calculation means 249, the second output value 248a is inputted into the transfer function Gn(s) of the actuator 241 from which the dead time is removed, whereby a third output value 249a is obtained. The third output value 249a is inputted into the deviation revision means 250.

In the deviation revision means 250, the third output value 249a is subtracted from the deviation 244a, whereby the revised deviation 250a is obtained. The revised deviation 250a is inputted into the PID controller 242.

According to the construction, the dead time included in the actuator 241 can be dealt with as a disturbance and the dead time can be pushed out from the feedback loop. Therefore, the control gain of the PID controller 242 can be set large, whereby the control can be stabilized and the responsibility of the control amount y can be improved. The dead time of the actuator 241 is not included in the control parameter of the dead time compensator 245 so that the dead time of the actuator 241 can be compensated even if the dead time of the actuator 241 is changed by aged variation or the like or an error exists in the modeling of the dead time, whereby the control can be stabilized.

The revision means 246 includes the fifth output value calculation means 251 and the operation amount revision means 252.

The fifth output value calculation means 251 is a PI controller and includes a proportional element outputting a value corresponding to an input value and an integral element outputting a cumulative value of the input value. The proportional gain is referred to as $K_{dist}$, and the integral gain is referred to as $I_{dist}$. Corresponding to the characteristics of the actuator 241, $K_{dist}$ and $I_{dist}$ are controlled suitably. When the integral gain of the actuator 241 is small, the proportional gain $K_{dist}$ may be set to be 0 so as to actuate the fifth output value calculation means 251 as an I controller. When the integral gain of the actuator 241 is large, the integral gain $I_{dist}$ may be set to be 0 so as to actuate the fifth output value calculation means 251 as a P controller. A fifth output value 251a which is a calculation value of the fifth output value calculation means 251 is inputted into the operation amount revision means 252.

In the operation amount revision means 252, the fifth output value 251a is added to the operation amount U(s) outputted from the PID controller 242, whereby a revised operation amount 252a is obtained. The revised operation amount 252a is inputted into the actuator 241 as a command voltage Vd.

According to the construction, even if the transfer function G(s) which is the actual model of the actuator 241 is changed by aged variation or the like or an error is generated in the transfer function G(s) which is the actual model of the actuator 241, any offset is not generated between the target value y* and the control amount y.

It may alternatively be constructed that each of the PID controller 242, the deviation calculation means 244, the dead time compensator 245 of the disturbance observer and the revision means 246 includes a CPU, a ROM, a RAM, a HDD and the like and the revised deviation 250a and the revised operation amount 252a are calculated with predetermined programs.

Figure 26:
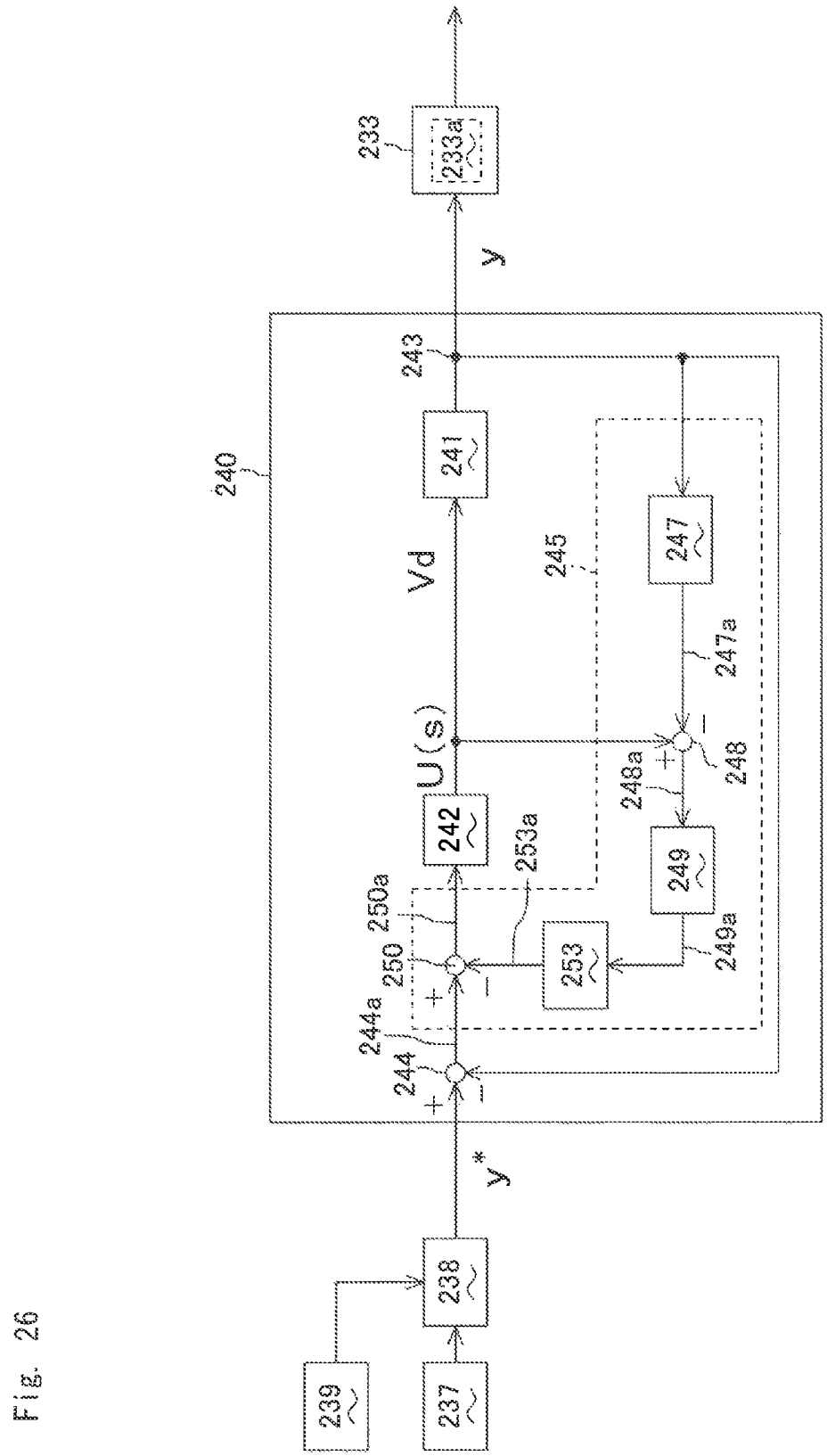
[FIG. 26] It is a block drawing of the feedback control device.

The feedback control device 240 may alternatively be constructed as mentioned below. As shown in FIG. 26, in the feedback control device 240, the third output value 249a is inputted into a high-pass filter through which only a frequency component not less than a set frequency can pass, and then obtains a fourth output value 253a. Subsequently, the fourth output value 253a is inputted into the deviation revision means 250. In the deviation revision means 250, the fourth output value 253a is subtracted from the deviation 244a, whereby the revised deviation 250a is obtained. The revised deviation 250a is inputted into the PID controller 242. In the PID controller 242, the operation amount U(s) is obtained from the revised deviation 250a. Then, the operation amount U(s) is inputted into the actuator 241.

Accordingly, the compensation of the dead time is valid only in the high frequency area which is unstable by the effect of the dead time and the compensation element is invalid in the other frequency area, whereby the offset of the control amount y caused by the error of the model can be suppressed.

Next, explanation will be given on the results of measurement of the system in FIG. 24 referring to FIGS. 27 and 28.

Figure 27:
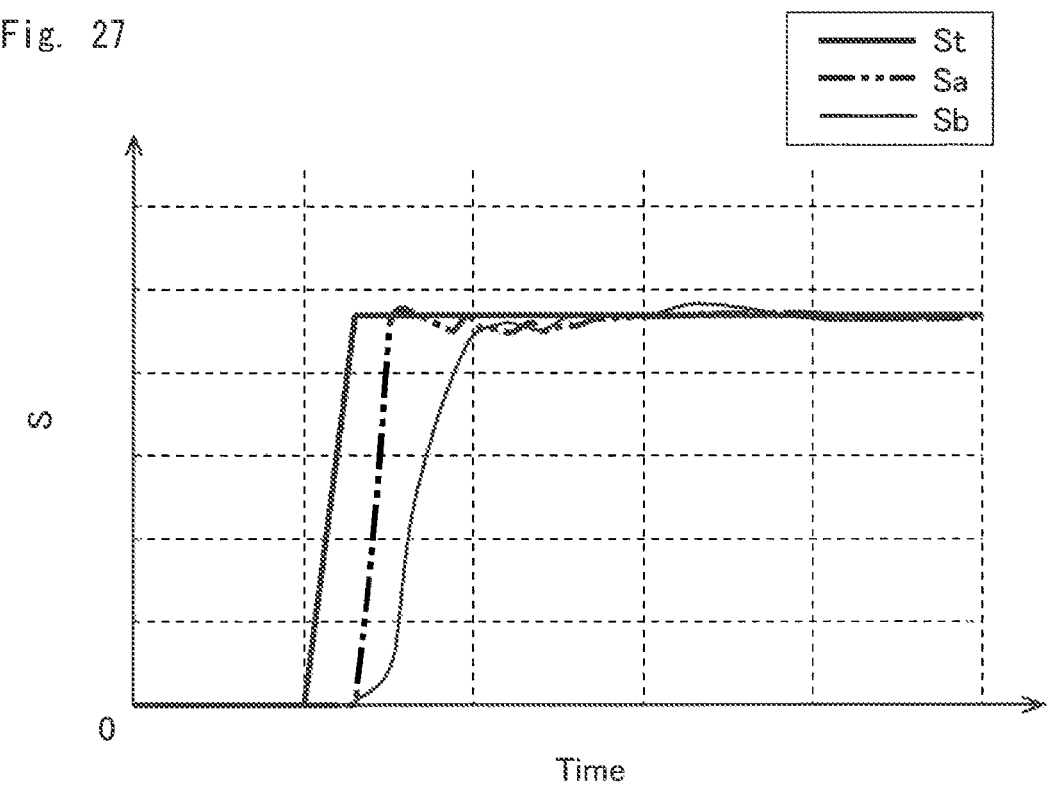
[FIG. 27] It is a graph showing performance of swash plate control by the disturbance observer.

As shown in FIG. 27, in the working vehicle 300, the wheel speed S is controlled by operating the speed change lever 237. In the case in which the dead time compensator 245 of the disturbance observer exists (Sa), the unstableness does not occur even if the proportional gain of the PID controller 242 is increased 40 times in comparison with the case in which the dead time compensator 245 of the disturbance observer does not exist (Sb), whereby the responsibility of the control of the swash plate can be improved.

Next, the results of the control of the swash plate (speed control) about optional setting of μ (μ1 to μ5) is shown in FIG. 28. In comparison with the case in which only the PID controller 242 is employed (that is, the dead time compensator 245 of the disturbance observer is not employed) as shown in FIG. 28(a), the responsibility of the speed change lever 237 just after operation is higher in the case in which the dead time compensator 245 of the disturbance observer is employed as shown in FIG. 28(b), and it is made known that the swash plate is controlled with the slant similar to the limit value B of the speed control. The response of the wheel speed S is off-setted along the direction of time about the limit value B of the speed control, that is, the response is compensated for the delay of the dead time. That is the feature of this control in which the dead time is pushed out from the feedback loop.

The feedback control device 201 of the controlled object 202 including the dead time 204 includes the detection means 206 detecting the control amount y of the controlled object 202, the first output value calculation means 211 inputting the control amount y into the inverse model of the transfer function of the controlled object 202 from which the dead time 204 is removed so as to obtain the first output value 211a, the second output value calculation means 212 subtracting the first output value 211a from the operation amount U(s) of the controlled object 202 so as to obtain the second output value 212a, the third output value calculation means 213 inputting the second output value 212a into the transfer function of the controlled object 202 from which the dead time 204 is removed so as to obtain the third output value 213a, the deviation calculation means 207 subtracting the control amount y from the target value y* of the control amount y so as to obtain the deviation 207a, the deviation revision means 214 subtracting the third output value 213a from the deviation 207a so as to obtain the revised deviation 214a, and the PID controller 205 which is the operation amount calculation means inputting the revised deviation 214a so as to obtain the operation amount U(s) of the controlled object 202.

Accordingly, in the feedback control of the controlled object 202 including the dead time 204, the dead time 204 of the controlled object 202 can be compensated and pushed out from the feedback loop. Therefore, even if the control gain is large, the control is stable. Accordingly, the control gain can be set large so as to improve the responsibility of the control amount y. Since the dead time 204 of the controlled object 202 is not included in the control parameter of the time compensator 210, the dead time 204 can be compensated even if the dead time 204 is changed by aged variation or the like or an error is generated in the modeling of the dead time 204, whereby the control can be performed stably.

The feedback control device 201 further includes the fifth output value calculation means 221 multiplying the predetermined control gain with the deviation 207a or integrating the deviation 207a for the predetermined time so as to obtain the fifth output value 221a, and the operation amount revision means 222 adding the fifth output value 221a to the operation amount U(s) so as to obtain the revised operation amount 222a. Accordingly, even if the actual model of the controlled object 202 is changed by aged variation or the like or an error is generated in the modeling of the controlled object 202, any offset is not generated between the target value and the control amount.

The feedback control device according to the embodiment of the present invention is the feedback control device 201 of the controlled object 202 including the dead time 204, and includes the detection means 206 detecting the control amount y of the controlled object 202, the first output value calculation means 211 inputting the control amount y into the inverse model of the transfer function of the controlled object 202 from which the dead time 204 is removed so as to obtain the first output value 211a, the second output value calculation means 212 subtracting the first output value 211a from the operation amount U(s) of the controlled object 202 so as to obtain the second output value 212a, the third output value calculation means 213 inputting the second output value 212a into the transfer function of the controlled object 202 from which the dead time 204 is removed so as to obtain the third output value 213a, the fourth output value calculation means 215 inputting the third output value 213a into the filter through which only the specific frequency component can pass so as to obtain the fourth output value 215a, the deviation calculation means 207 subtracting the control amount y from the target value y* of the control amount y so as to obtain the deviation 207a, the deviation revision means 214 subtracting the fourth output value 215a from the deviation 207a so as to obtain the revised deviation 214a, and the PID controller 205 which is the operation amount calculation means inputting the revised deviation 214a so as to obtain the operation amount U(s) of the controlled object 202.

Accordingly, in the feedback control of the controlled object 202 including the dead time 204, the dead time 204 of the controlled object 202 can be compensated and pushed out from the feedback loop. Therefore, even if the control gain is large, the control is stable. Accordingly, the control gain can be set large so as to improve the responsibility of the control amount y. Since the dead time 204 of the controlled object 202 is not included in the control parameter of the time compensator 210, the dead time 204 can be compensated even if the dead time 204 is changed by aged variation or the like or an error is generated in the modeling of the dead time 204, whereby the control can be performed stably. Even if the actual model of the controlled object 202 is changed by aged variation or the like or an error is generated in the modeling of the controlled object 202, any offset is not generated between the target value y and the control amount y*.

In the feedback control device 201 according to the embodiment of the present invention, the control amount y of the controlled object 202 including the dead time 204 is inputted into the inverse model of the transfer function of the controlled object 202 from which the dead time 204 is removed so as to calculate the first output value 211a, the first output value 211a is subtracted from the operation amount U(s) of the controlled object 202 so as to calculate the second output value 212a, the second output value 212a is inputted into the transfer function of the controlled object 202 from which the dead time 204 is removed so as to calculate the third output value 213a, the third output value 213a is subtracted from the deviation 207a so as to calculate the revised deviation 214a, and the feedback control is performed based on the revised deviation 214a.

Accordingly, in the feedback control of the controlled object 202 including the dead time 204, the dead time 204 of the controlled object 202 can be compensated and pushed out from the feedback loop. Therefore, even if the control gain is large, the control is stable. Accordingly, the control gain can be set large so as to improve the responsibility of the control amount y. Since the dead time 204 of the controlled object 202 is not included in the control parameter of the time compensator 210, the dead time 204 can be compensated even if the dead time 204 is changed by aged variation or the like or an error is generated in the modeling of the dead time 204, whereby the control can be performed stably. Even if the actual model of the controlled object 202 is changed by aged variation or the like or an error is generated in the modeling of the controlled object 202, any offset is not generated between the target value y and the control amount y*.

In the feedback control device 201 according to the embodiment of the present invention, the control amount y of the controlled object 202 including the dead time 204 is inputted into the inverse model of the transfer function of the controlled object 202 from which the dead time 204 is removed so as to calculate the first output value 211a, the first output value 211a is subtracted from the operation amount U(s) of the controlled object 202 so as to calculate the second output value 212a, the second output value 212a is inputted into the transfer function of the controlled object 202 from which the dead time 204 is removed so as to calculate the third output value 213a, the third output value 213a is inputted into the filter through which only the specific frequency component can pass so as to calculate the fourth output value 215a, the fourth output value 215a is subtracted from the deviation 207a so as to calculate the revised deviation 214a, and the feedback control is performed based on the revised deviation 214a.

Accordingly, in the feedback control of the controlled object 202 including the dead time 204, the dead time 204 of the controlled object 202 can be compensated and pushed out from the feedback loop. Therefore, even if the control gain is large, the control is stable. Accordingly, the control gain can be set large so as to improve the responsibility of the control amount y. Since the dead time 204 of the controlled object 202 is not included in the control parameter of the time compensator 210, the dead time 204 can be compensated even if the dead time 204 is changed by aged variation or the like or an error is generated in the modeling of the dead time 204, whereby the control can be performed stably. Even if the actual model of the controlled object 202 is changed by aged variation or the like or an error is generated in the modeling of the controlled object 202, any offset is not generated between the target value y and the control amount y*.

INDUSTRIAL APPLICABILITY

The present invention can be employed for an art of a vehicle which can steer four wheels independently. In more detail, the present invention can be employed for an art of control for steering the four wheels based on an operation member.

The invention claimed is:
1. A feedback control method comprising:
using a controller to calculate a first output value by inputting a control amount of a controlled object including a dead time which is a delay time of response about an input into an inverse model of a transfer function of the controlled object from which the dead time is removed,
using the controller to calculate a second output value by subtracting the first output value from the operation amount of the controlled object,
using the controller to calculate a third output value by inputting the second output value into the transfer function of the controlled object from which the dead time is removed,
using the controller to calculate a revised deviation by subtracting the third output value from a deviation, and
using the controller to perform feedback control based on the revised deviation.
2. A feedback control method comprising:
using a controller to calculate a first output value by inputting a control amount of a controlled object including a dead time which is a delay time of response about an input into an inverse model of a transfer function of the controlled object from which the dead time is removed,
using the controller to calculate a second output value by subtracting the first output value from the operation amount of the controlled object using the controller to calculate a third output value by inputting the second output value into the transfer function of the controlled object from which the dead time is removed, using the controller to calculate a fourth output value by inputting the third output value into a filter through which only a specific frequency component can pass, using the controller to calculate a revised deviation by subtracting the fourth output value from a deviation, and using the controller to perform feedback control based on the revised deviation.

3. A control system comprising a controller that includes memory and one or more processors configured to:

calculate a first output value by inputting a control amount of a controlled object including a dead time which is a delay time of response about an input into an inverse model of a transfer function of the controlled object from which the dead time is removed, calculate a second output value by subtracting the first output value from the operation amount of the controlled object, calculate a third output value by inputting the second output value into the transfer function of the controlled object from which the dead time is removed, calculate a revised deviation by subtracting the third output value from a deviation, and perform feedback control based on the revised deviation.

4. A control system comprising a controller that includes memory and one or more processors configured to:

calculate a first output value by inputting a control amount of a controlled object including a dead time Which is a delay time of response about an input into an inverse model of a transfer function of the controlled object from which the dead time is removed, calculate a second output value by subtracting the first output value from the operation amount of the controlled object, calculate a third output value by inputting the second output value into the transfer function of the controlled object from which the dead time is removed, calculate a fourth output value by inputting the third output value into a fitter through which only a specific frequency component can pass, calculate a revised deviation by subtracting the fourth output value from a deviation, and perform feedback control based on the revised deviation.

* * * * *

UNITED STATES PATENT AND TRADEMARK OFFICE
CERTIFICATE OF CORRECTION

PATENT NO. : 8,630,770 B2
APPLICATION NO. : 13/264805
DATED : January 14, 2014
INVENTOR(S) : Keiji Matsumoto et al.

Page 1 of 1

It is certified that error appears in the above-identified patent and that said Letters Patent is hereby corrected as shown below:

On the Title Page, Item (73)

In the Assignee's section, please delete "Yanmar, Co., LTD" and insert --Yanmar Co., LTD--;

In the Claims

Column 36, see claim 4, line 7, please delete "Which" and insert --which--.

Signed and Sealed this
Eleventh Day of November, 2014

Michelle K. Lee
*Deputy Director of the United States Patent and Trademark Office*